US011904487B2

(12) United States Patent
Neumann et al.

(10) Patent No.: US 11,904,487 B2
(45) Date of Patent: Feb. 20, 2024

(54) PILE CUTTING DEVICE COMPRISING A FIRST PILE POSITIONING UNIT

(71) Applicant: KOENIG & BAUER AG, Würzburg (DE)

(72) Inventors: Jann Neumann, Darmstadt (DE); Martin Palme, Kist (DE); Jens Sauer, Würzburg (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 17/909,786

(22) PCT Filed: Oct. 4, 2021

(86) PCT No.: PCT/EP2021/077254
§ 371 (c)(1),
(2) Date: Sep. 7, 2022

(87) PCT Pub. No.: WO2022/100928
PCT Pub. Date: May 19, 2022

(65) Prior Publication Data
US 2023/0191640 A1 Jun. 22, 2023

(30) Foreign Application Priority Data
Nov. 12, 2020 (DE) ..................... 10 2020 129 872.2

(51) Int. Cl.
*B26D 1/08* (2006.01)
*B26D 7/02* (2006.01)
(Continued)

(52) U.S. Cl.
CPC ............... *B26D 1/08* (2013.01); *B26D 7/025* (2013.01); *B26D 7/0675* (2013.01); *B26D 11/00* (2013.01)

(58) Field of Classification Search
CPC .. B26D 7/0675; B26D 7/32; B26D 2007/322; B26D 7/015; B26D 11/00; B26D 1/08; B26D 7/025
See application file for complete search history.

(56) References Cited

U.S. PATENT DOCUMENTS 2,329,890 A * 9/1943 Fisher .................... B26D 7/016 83/418
4,512,227 A * 4/1985 Salvagnini ............. B23D 15/06 83/112
5,127,294 A * 7/1992 Mohr ........................ B26D 1/08 83/468.5

FOREIGN PATENT DOCUMENTS

DE 19515705 C1 10/1996
DE 19843011 A1 3/2000
(Continued)

OTHER PUBLICATIONS

Translation of FR-3093468-A1.*
International Search Report of PCT/EP2021/077254 dated Jan. 25, 2022.

*Primary Examiner* — Jonathan G Riley
(74) *Attorney, Agent, or Firm* — MATTINGLY & MALUR, PC

(57) ABSTRACT

In some examples, a pile cutting device includes a first pile positioning unit, a cutting unit for cutting at least one sheet pile, and a bearing device including a first pile bearing surface. The first pile positioning unit includes an upper rotary plunger that can be pivoted about a pivot axis and moved with respect to a vertical direction, and also includes a first horizontal drive for moving a sheet pile in and/or counter to a horizontal direction. The first pile positioning unit further includes two upper pressing elements that differ from the upper rotary plunger, and that are movable with respect to the vertical direction. A first one of the upper
(Continued)

pressing elements is movable in and/or counter to the horizontal direction by the first horizontal drive. A second one of the upper pressing elements is movable in and/or counter to the horizontal direction by a second horizontal drive.

13 Claims, 20 Drawing Sheets

(51) Int. Cl.
*B26D 7/06* (2006.01)
*B26D 11/00* (2006.01)

(56) References Cited

FOREIGN PATENT DOCUMENTS

| | | | | | |
|---|---|---|---|---|---|
| DE | 19914580 | A1 | * | 10/2000 | ............. B26D 7/015 |
| DE | 19914580 | A1 | | 10/2000 | |
| DE | 10124068 | A1 | | 2/2002 | |
| DE | 1593467 | A1 | | 11/2005 | |
| EP | 429941 | A | * | 6/1991 | ............... B26D 1/08 |
| EP | 1504860 | A1 | | 2/2005 | |
| EP | 2332864 | A1 | | 6/2011 | |
| FR | 3093468 | A1 | * | 9/2020 | |
| WO | WO-2021047869 | A1 | * | 3/2021 | |

* cited by examiner 18
72
74
73
26; 71

V
F
G

PILE CUTTING DEVICE COMPRISING A FIRST PILE POSITIONING UNIT

CROSS-REFERENCES TO RELATED APPLICATIONS

This application is the US national phase, under 35 USC § 371, of PCT/EP2021/077254, filed on Oct. 4, 2021, published as WO 2022/100928 A1 on May 19, 2022, and claiming priority to DE 10 2020 129 872.2, filed Nov. 12, 2020, the disclosures of which are expressly incorporated by reference herein in their entireties.

TECHNICAL FIELD

Examples herein relate to a pile cutting device including a first pile positioning unit, a cutting unit for cutting at least one sheet pile, and a bearing device including a first pile bearing surface. The first pile positioning unit has an upper rotary plunger that can be pivoted about a pivot axis and moved with respect to a vertical direction. The first pile positioning unit further includes a first horizontal drive for moving a sheet pile in and/or counter to a first horizontal direction.

Examples further relate to a method for cutting a sheet pile by means of a pile cutting device. For instance, the sheet pile initially rests on a first pile bearing surface of a first bearing device. In a first forward-feed operation, the sheet pile is moved in or counter to a first horizontal direction, pointing from upper pressing elements at a first cutting unit, by means of at least two upper pressing elements acting vertically from above on the sheet pile. Thereafter, in a first lowering operation, an upper rotary plunge is lowered such that its lower contact surface makes contact with the sheet pile. Further, in a first release operation, the at least two upper pressing elements are moved upwardly and lifted off the sheet pile.

BACKGROUND

Pile cutting devices are used in particular to cut piles of sheets into multiple-up piles. Such multiple-up piles are, for example, security piles, and in particular bank note piles. As an alternative, such multiple-up piles can also be piles of labels or business cards. Devices are known by means of which the particular pile of sheets is initially trimmed at its edges, and thereafter is cut into in particular strip-shaped intermediate piles, which are then in turn cut into multiple-up piles.

A pile cutting device is known from DE 195 15 705 C1, comprising a pile bearing surface and a rotary plunger that can be pivoted about a vertical pivot axis so as to pivot a pile of sheets, wherein the rotary plunger can additionally be moved horizontally by means of a horizontal drive so as to move the sheet pile horizontally.

Sheets lying as flat as possible on top of one another can be wavy. In a pile of sheets, the bottom sheets are pressed flat by respective layers lying thereabove. In this way, it is possible for sheets lying further toward the top to be positioned wavier than those lying further to the bottom. Wavier sheets have a lesser extension in the horizontal direction. If the edge of the entire pile is now cut away, in some circumstances less material is cut away from the upper sheets than from the bottom sheets.

A pile cutting device comprising a first pile positioning unit is known from DE 198 43 011 A1, wherein the pile cutting device comprises a cutting unit for piles of sheet, which comprises a knife bar including a knife, and wherein the pile positioning unit comprises a pivotable and vertically movable upper rotary plunger and a horizontal drive for moving a pile of sheets with respect to a horizontal direction that points from the upper rotary plunger to the knife.

A pile cutting device is known from DE 101 24 068 A1, comprising an upper pressing plate at which an upper rotary plunger is mounted in a spring-loaded manner. The rotary plunger can be lowered onto the pile alone or together with the pressing plate. In addition, a gripper loading station is provided.

A pile cutting device is known from EP 1 593 467 A1, comprising an upper and a lower rotary plunger, which can be moved together in a horizontal direction so as to move a clamped pile of sheets in a horizontal direction.

A pile cutting device is known from EP 1 504 860 A1, in which piles are moved along a circular course to different knives, without their alignment changing. Additionally, a feeding device and a discharge device are disclosed.

SUMMARY

It is an object herein to provide a pile cutting device comprising a first pile positioning unit, and a method for cutting a pile of sheets by means of a pile cutting device.

This object may be attained by a pile cutting device in which a first pile positioning unit includes two upper pressing elements that differ from the upper rotary plunger, and that are movable with respect to the vertical direction. A first one of the upper pressing elements is movable in and/or counter to the first horizontal direction by a first horizontal drive. A second one of the upper pressing elements is movable in and/or counter to the first horizontal direction by a second horizontal drive.

In some examples, this object may also be achieved by a method for cutting a pile of sheets in which, in a first pivoting operation, an upper rotary plunger is pivoted about a vertical pivot axis, whereby the sheet pile is pivoted about the vertical pivot axis. Thereafter, in a second lowering operation, the two upper pressing elements are moved downwardly and brought in contact with the sheet pile. In a second release operation, the upper rotary plunger is moved upwardly and lifted off the sheet pile. In a second forward-feed operation, the sheet pile is moved in or counter to a horizontal direction by the two upper pressing elements. In a first cutting operation, a partial pile is cut off the sheet pile by a cutting device.

A pile cutting device comprising a first pile positioning unit comprises at least one first cutting unit for cutting at least one pile of sheets, wherein the pile cutting device comprises at least one bearing device including a first pile bearing surface, and wherein the first pile positioning unit comprises an upper rotary plunger, which can be pivoted about an in particular vertically oriented pivot axis and moved with respect to a vertical direction, and whose lower contact surface is preferably arranged higher than the first pile bearing surface, and wherein the first pile positioning unit comprises at least one first horizontal drive for moving at least one pile of sheets in and/or counter to a first horizontal direction. The first pile positioning unit comprises at least one upper pressing element that differs from the upper rotary plunger, in particular a gripper upper part, which can be moved with respect to the vertical direction and which is arranged so as to be movable in and/or counter to the first horizontal direction by means of the at least one first horizontal drive, in particular so as to move a pile of sheets in and/or counter to the first horizontal direction. This offers the advantage that the pile to be cut can be handled very precisely since a multiplicity of work steps, such as cutting, rotating or linearly moving, can be carried out, without completely releasing the pile. This increases the precision of the transport and additionally allows the position of the pile of sheets to be inferred solely from the movements of the corresponding components.

The first pile positioning unit comprises at least two upper pressing elements that differ from the upper rotary plunger, in particular gripper upper parts, which can be moved with respect to the vertical direction and which are arranged so as to be movable in and/or counter to the first horizontal direction by means of the at least one first horizontal drive, in particular so as to move a pile of sheets in and/or counter to the first horizontal direction. This offers the advantage that an even more precise translation is made possible. Moreover, an intended pivoting movement can be carried out, for example, during a translation. In an alternative or additional refinement, the pile cutting device is preferably characterized in that a first upper pressing element, in particular a first upper pressing element of the at least two upper pressing elements, is arranged so as to be movable in and/or counter to the first horizontal direction by means of a first horizontal drive, and that a second upper pressing element, in particular a second upper pressing element of the at least two upper pressing elements, is arranged so as to be movable in and/or counter to the horizontal direction by means of a second horizontal drive. This allows the pile of sheets to be aligned particularly rapidly and precisely, with small pivot angles.

In an alternative or additional refinement, the pile cutting device is preferably characterized in that the first pile positioning unit comprises a lower rotary plunger, which can be pivoted about the pivot axis and moved, for example, with respect to the vertical direction. The upper contact surface thereof is more preferably arranged no higher than at the height of the first pile bearing surface. In an alternative or additional refinement, the pile cutting device is preferably characterized in that the first pile bearing surface has a lower rotary plunger recess, in which the lower rotary plunger is at least partially arranged. This improves the precision of pivoting operations since the pile can be held between two elements that move together.

In an alternative or additional refinement, the pile cutting device is preferably characterized in that the first pile positioning unit comprises at least one lower pressing element that differs in particular from the lower rotary plunger, in particular a gripper lower part, which can be moved in and/or counter to the first horizontal direction by means of at least one first horizontal drive, in particular so as to move a pile of sheets in and/or counter to the first horizontal direction. For example, the at least one lower pressing element can be moved with respect to the vertical direction. Two pressing elements in each case can then, for example, form a respective gripper, which allows increased precision of translational processes. In an alternative or additional refinement, the pile cutting device is preferably characterized in that in each case an upper pressing element and a lower pressing element are assigned to one another and together form a pile gripper, and that the respective upper pressing element and the respective lower pressing element, which together form a respective pile gripper, are arranged so as to be jointly movable in and/or counter to the first horizontal direction.

In an alternative or additional refinement, the pile cutting device is preferably characterized in that the pile cutting device comprises at least one first upper pressing plate, which is arranged so as to be movable with respect to the vertical direction, and more preferably in that at least a portion of the at least one first upper pressing plate is arranged upstream from the upper rotary plunger, based on the first horizontal direction, and that least a portion of the at least one first upper pressing plate is arranged downstream from the upper rotary plunger, based on the first horizontal direction. This makes it possible to press previously wavy upper layers of a pile of sheets so as to be smooth. In this way, preferably uniformly sized lengths of the sheets are cut off by the corresponding knife, regardless of the height at which the particular sheet is located in the pile of sheets.

In an alternative or additional refinement, the pile cutting device is preferably characterized in that the upper rotary plunger and the respective at least one upper pressing element are situated at a smallest distance with respect to one another, which is no more than 100 mm, more preferably no more than 50 mm, still more preferably no more than 30 mm, still more preferably no more than 20 mm, still more preferably no more than 10 mm, still more preferably no more than 5 mm, and still more preferably no more than 2 mm and/or that the lower rotary plunger and the respective at least one lower pressing element are situated at a smallest distance with respect to one another, which is no more than 100 mm, more preferably no more than 50 mm, still more preferably no more than 30 mm, more preferably no more than 20 mm, still more preferably no more than 10 mm, still more preferably no more than 5 mm, and still more preferably no more than 2 mm.

In particular, this pile cutting device enables a method for cutting a pile of sheets by means of a pile cutting device, wherein the pile of sheets initially rests on a first pile bearing surface of a first bearing device, and wherein, in a first forward-feed operation, the pile of sheets is moved in or counter to a first horizontal direction, pointing from the upper pressing elements at a first cutting unit, by means of at least two upper pressing elements acting vertically from above on the pile of sheets, and wherein thereafter, in a first lowering operation, an upper rotary plunger is lowered such that its lower contact surface makes contact with the pile of sheets, and wherein thereafter, in a first release operation, the at least two upper pressing elements are moved upwardly and lifted off the pile of sheets, and wherein thereafter, in a first pivoting operation, the upper rotary plunger is pivoted about a vertical pivot axis and the pile pf sheets is thereby pivoted about the vertical pivot axis, and wherein thereafter, in a second lowering operation, the at least two upper pressing elements are moved downwardly and brought in contact with the pile of sheets, and wherein thereafter, in a second release operation, the upper rotary plunger is moved upwardly and lifted off the pile of sheets, and wherein thereafter, in a second forward-feed operation, the pile of sheets is moved in or counter to the first horizontal direction by means of the at least two upper pressing elements acting in particular vertically from above onto the pile of sheets, and wherein thereafter, in a first cutting operation, a partial pile is cut off the sheet pile by means of the first cutting unit.

In an alternative or additional refinement, the method is preferably characterized in that, after the second forward-feed operation and prior to the first cutting operation, the upper rotary plunger and/or a first upper pressing plate are lowered from above onto the pile of sheets and are brought in contact therewith in a smooth-pressing operation.

In an alternative or additional refinement, the method is preferably characterized in that, in at least one operation of the method, the pile of sheets is moved in or counter to the first horizontal direction by means of the at least two upper pressing elements, and in the process its orientation is changed in that the at least two upper pressing elements are moved different distances in or counter to the first horizontal direction while they move the pile of sheets.

BRIEF DESCRIPTION OF THE DRAWINGS

Exemplary embodiments of the invention are illustrated in the drawings and will be described in greater detail below. The drawings show.

DETAILED DESCRIPTION

Figure 1:
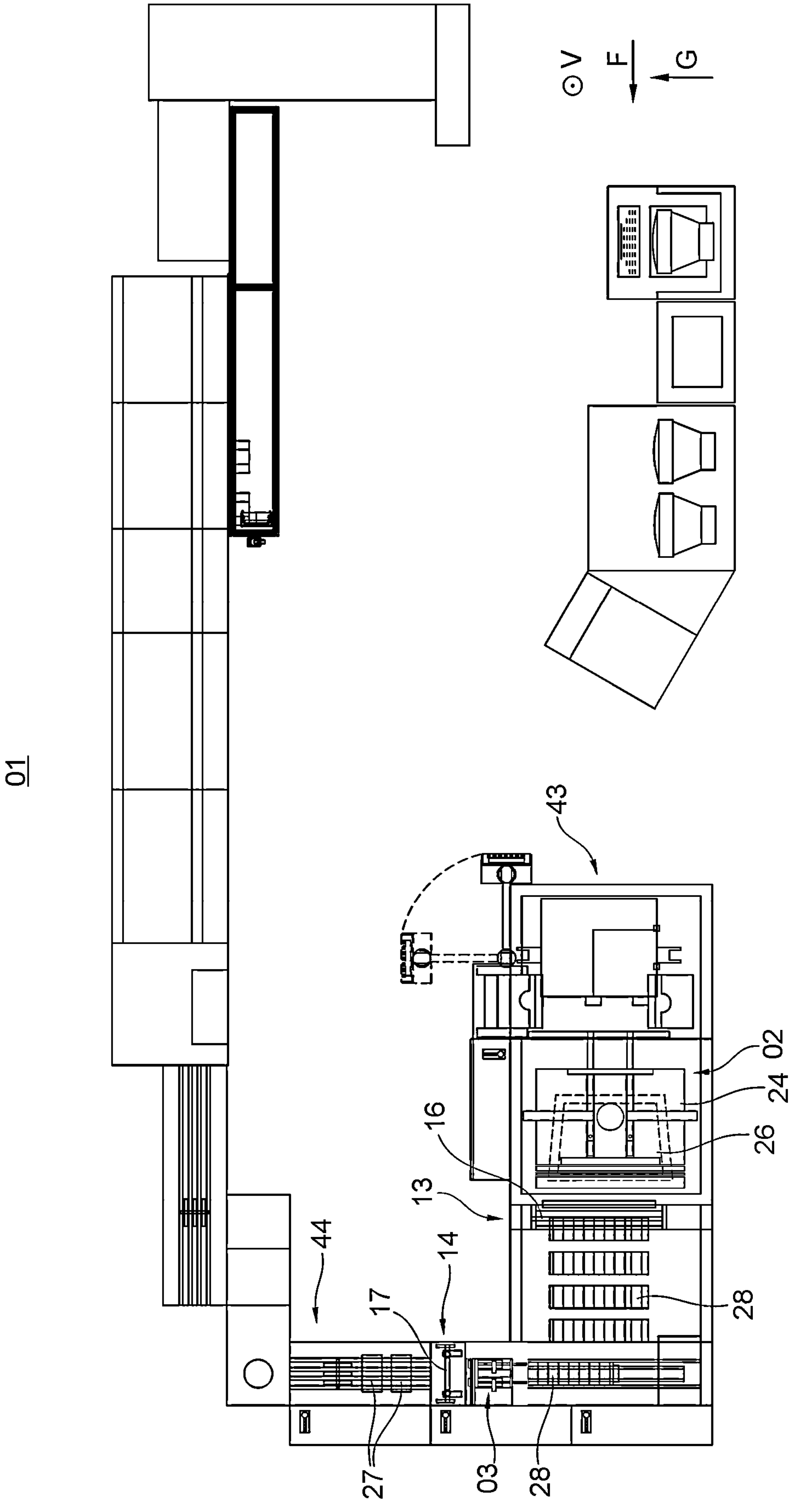
FIG. 1 a schematic representation of a pile cutting device in a top view.
Figure 2:
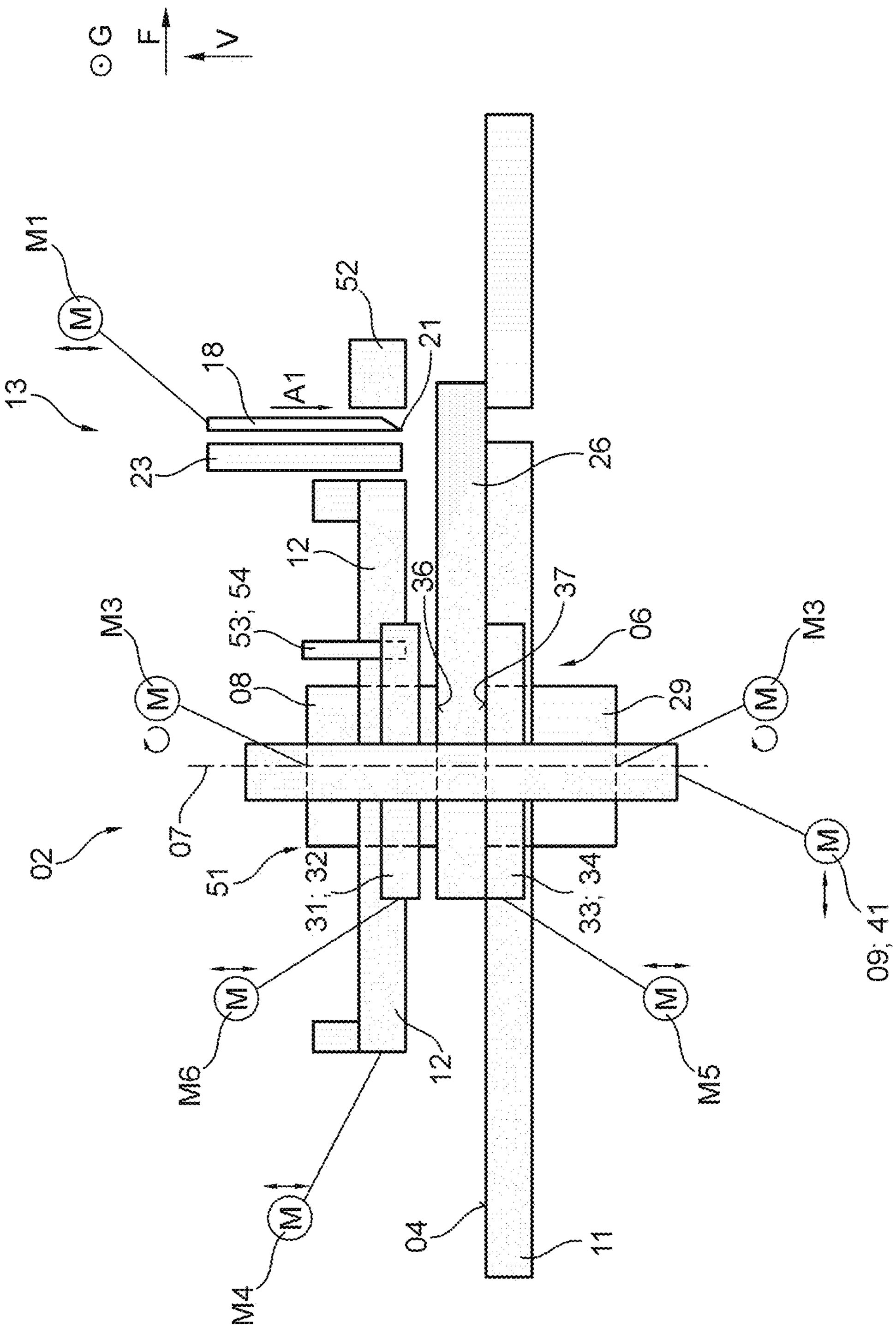
FIG. 2 a schematic representation of a first pile positioning unit and a first cutting unit in a side view.
Figure 3:
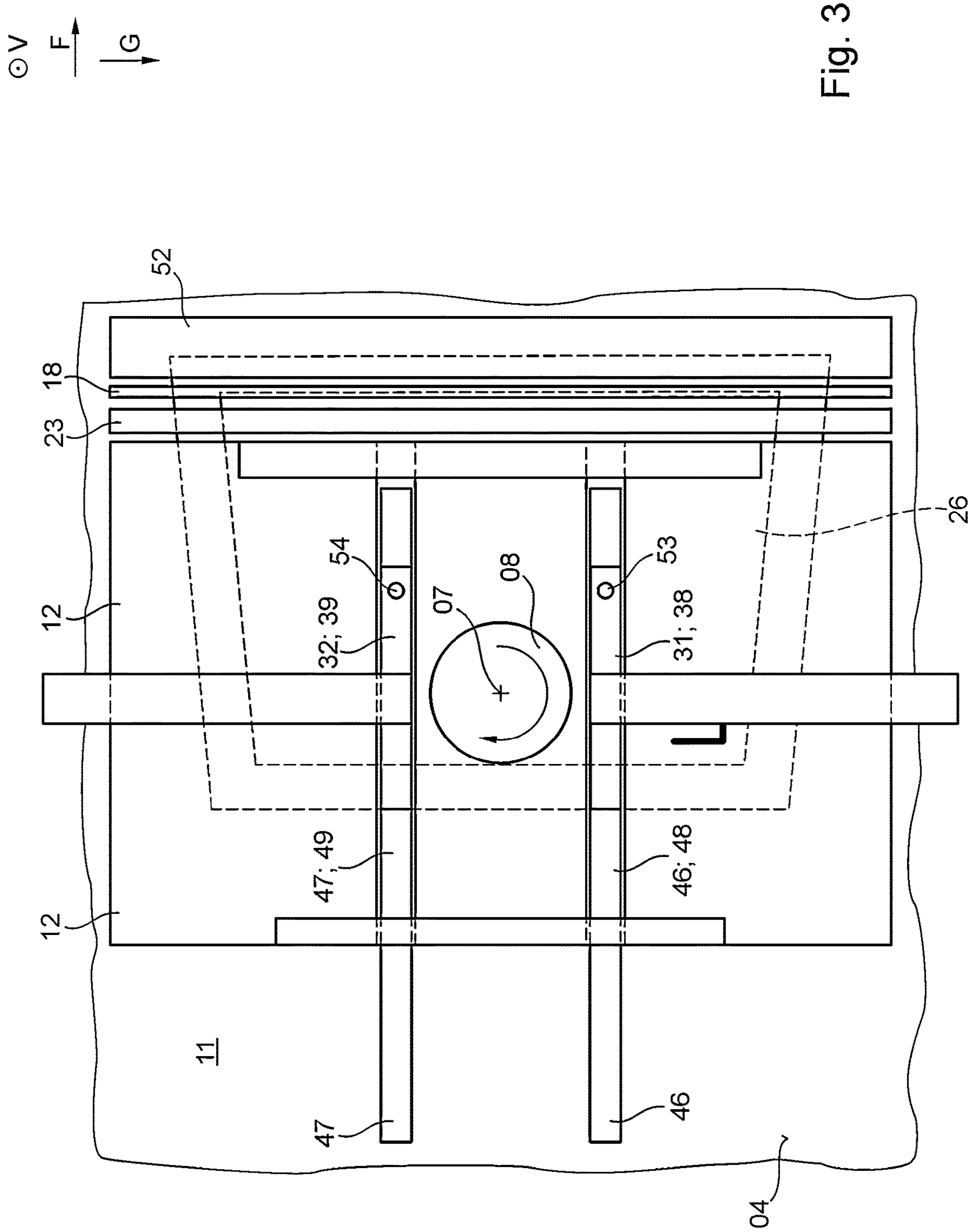
FIG. 3 a schematic representation of a first pile positioning unit and a first cutting unit according to FIG. 2 in a top view.
Figure 4:
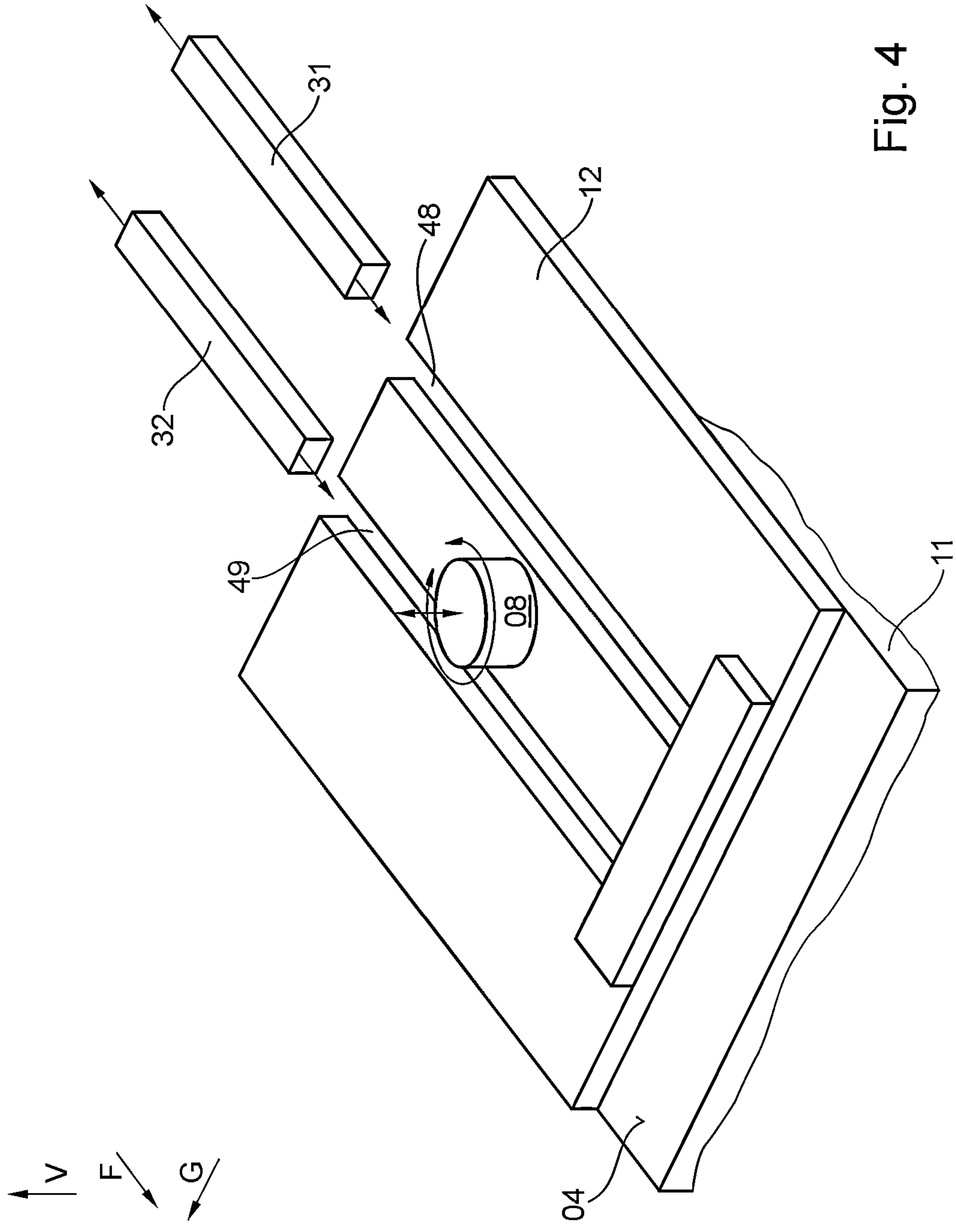
FIG. 4 a schematic representation of a first pile positioning unit and a first cutting unit in an oblique view.
Figure 5:
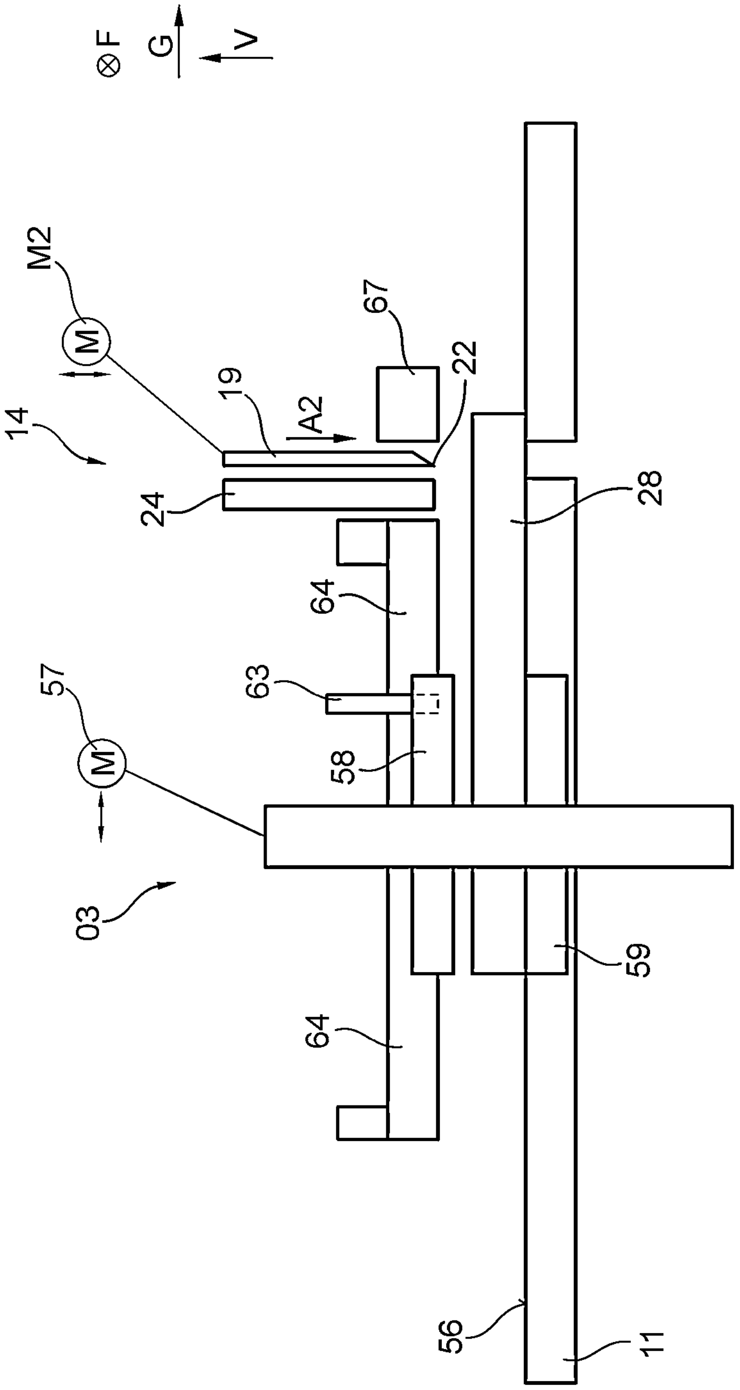
FIG. 5 a schematic representation of a second pile positioning unit and a second cutting unit in a side view.
Figure 6:
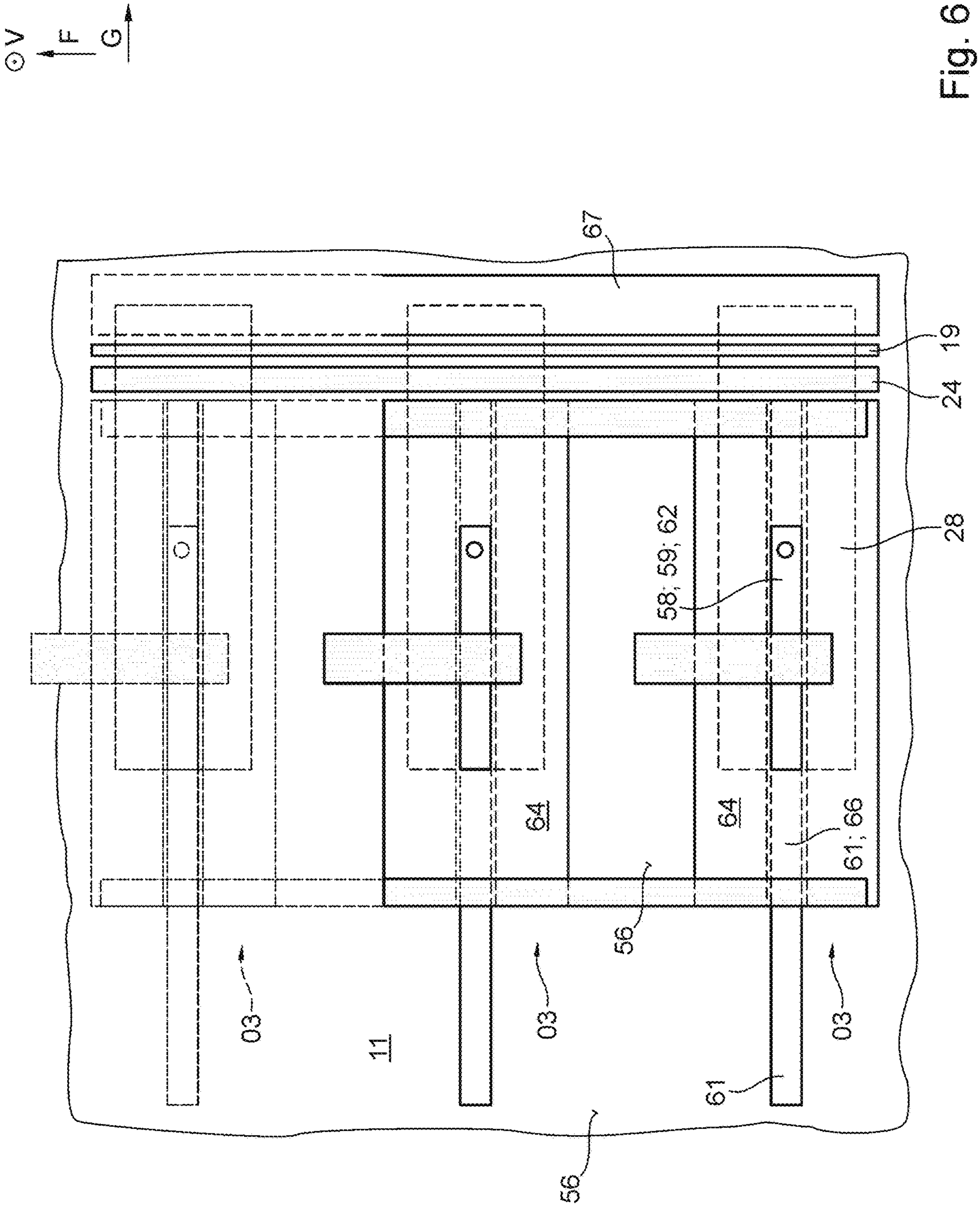
FIG. 6 a schematic representation of two pile positioning units and a first cutting unit according to FIG. 5 in a top view.

A pile cutting device 01 for cutting sheet piles 26 into multiple-up piles 27, in particular security piles 27, preferably comprises at least one in particular first cutting unit 13, which is also referred to as in particular a first pile cutting unit 13. In addition to the first cutting unit 13, the pile cutting device 01 preferably comprises at least one second cutting unit 14, which is also referred to as in particular a second pile cutting unit 14. By arranging multiple cutting units 13; 14, unnecessary multiple pivoting of the corresponding piles can be dispensed with, and the throughput can be increased.

The first cutting unit 13 preferably comprises at least one first knife bar 16, at which a first knife 18 is arranged. The first knife 18 preferably includes a first cutting edge 21, which is preferably configured as a linear cutting edge 21. A respective cutting edge 21; 22 is preferably an in particular straight line at which two surfaces of a corresponding knife come together and which is configured to separate or sever material. The first knife bar 16 is preferably arranged so as to be movable along a preferably linear, and more preferably exclusively linear, first adjustment path, in particular in and/or counter to a first adjustment direction A1.

In a refinement, the first cutting unit 13 is preferably characterized in that the first cutting unit 13 comprises at least one first cutting aid 23, in particular a first press bar 23 for fixing sheet piles 26 and/or intermediate piles 28 and/or multiple-up piles 27, which is arranged so as to be at least movable with respect to a vertical direction V and which is arranged upstream from the first knife 18 along a transport path intended for a transport of sheet piles 26 and/or intermediate piles 28 and/or multiple-up piles 27. Preferably, maximum contact pressures between 0.5 $N/mm^2$ (half a newton per square millimeter) and 2 $N/mm^2$ (two newtons per square millimeter) are exerted by way of the first cutting aid 23. In this way, it can be ensured that, during cutting, no layers are displaced in relation to one another, and that a clean cut of all layers is carried out. For example, at least one first hold-down device 52 is arranged downstream from the first knife 18 along the intended transport path, which is in particular used to prevent cut-off components from being flung off in an uncontrolled manner.

In an alternative or additional refinement, the first cutting unit 13 is preferably characterized in that the first cutting unit 13 comprises at least one first cutting drive M1 for moving the first knife bar 16 in and/or counter to the first adjustment direction A1 and/or that the at least one first cutting drive M1 is configured as an electric motor M1 and/or as a linear motor M1 and/or as a pneumatic drive M1 and/or as a hydraulic drive M1.

The preferably provided second cutting unit 14 preferably comprises at least one second knife bar 17, at which a second knife 19 is arranged. The second knife 19 includes an in particular second cutting edge 22, which is preferably configured as a linear cutting edge 22. The second knife bar 17 is preferably arranged so as to be movable in and/or counter to a second adjustment direction A2 along a preferably linear, and more preferably exclusively linear, second adjustment path.

In an alternative or additional refinement, the second cutting unit 14 is preferably characterized in that the second cutting unit 14 comprises at least one second cutting aid 24, in particular a second press bar 24 for fixing sheet piles 26 and/or intermediate piles 28 and/or multiple-up piles 27, which is arranged so as to be at least movable with respect to the vertical direction V and which is arranged upstream from the second knife 19 along a transport path intended for a transport of sheet piles 26 and/or intermediate piles 28 and/or multiple-up piles 27. Preferably, maximum contact pressures between 0.5 $N/mm^2$ (half a newton per square millimeter) and 2 $N/mm^2$ (two newtons per square millimeter) are exerted by way of the second cutting aid 24. In this way, it can be ensured that, during cutting, no layers are displaced in relation to one another, and that a clean cut of all layers is carried out. For example, at least one second hold-down device 52 is arranged downstream from the second knife 19 along the intended transport path, which is in particular used to prevent cut-off components from being flung off in an uncontrolled manner.

In an alternative or additional refinement, the second cutting unit 14 is preferably characterized in that the second cutting unit 14 comprises at least one second cutting drive M2 for moving the second knife bar 17 in and/or counter to the second adjustment direction A2 and that the at least one second cutting drive M2 is configured as an electric motor M2 and/or as a linear motor M2 and/or as a pneumatic drive M2 and/or as a hydraulic drive M2.

In an alternative or additional refinement, the pile cutting device 01 is preferably characterized in that the pile cutting device 01 comprises at least one first pile positioning unit 02, in particular for positioning at least one respective sheet pile 26. A pivot axis 07 assigned to this first pile positioning unit 02 is preferably oriented parallel to a vertical direction V. In an alternative or additional refinement, the pile cutting device 01 and/or the respective cutting unit 13; 14 are preferably characterized by comprising at least one sheet feed zone 43 and at least one multiple-up discharge zone 44 or security discharge zone 44. The pile cutting device 01 is used in particular to generate several multiple-up piles 27, in particular security piles 27, from at least one respective sheet pile 26.

For example, the at least one first pile positioning unit 02 is preferably arranged immediately downstream in the sheet feed zone 43 or along an intended transport path. For example, the first cutting unit 13 is arranged downstream from the first pile positioning unit 02. Preferably, the first pile positioning unit 02 is assigned to the first cutting unit 13, in particular to be able to align respective sheet piles 26 in an optimized manner.

The pile cutting device 01 comprises the in particular first pile positioning unit 02. The pile cutting device 01 comprises the at least one first cutting unit 13 for cutting at least one sheet pile 26. This first cutting unit 13 preferably comprises at least the first knife 18, and more preferably also the first cutting aid 23. The pile cutting device 01 comprises at least one first bearing device 11 including a first pile bearing surface 04. The at least one first bearing device 11 is configured as a first table 11, for example. The at least one first bearing device 11 is in particular used to support from below the sheet pile 26 and/or intermediate pile 28 and/or multiple-up pile 27 to be cut and/or to be positioned. The first pile bearing surface 04 comprises air nozzles, for example, but is preferably configured to be as smooth as possible. The first pile positioning unit 02 comprises an upper rotary plunger 08, which can be pivoted about the in particular vertically oriented pivot axis 07 and moved with respect to the vertical direction V. Its lower contact surface 36 is preferably arranged higher than the pile bearing surface 04, in particular such that a sheet pile 26 fits therebetween. The upper rotary plunger 08 is preferably used to bring about a rotation of the particular sheet pile 26 and/or intermediate pile 28 and/or multiple-up pile 27, in particular so as to align the same relative to the first knife 18. Preferably, at least one first pivot drive M3 is arranged, by means of which at least the upper rotary plunger 08 can be pivoted.

The first pile positioning unit 02 comprises at least one first horizontal drive 09 for moving at least one sheet pile 26 in and/or counter to a first horizontal direction F. This first horizontal direction F, for example, points from the upper rotary plunger 08 to the first knife 18 and/or is preferably oriented orthogonally to the first cutting edge 21. The at least one first horizontal drive 09 is preferably used to bring about at least one translation of the respective sheet pile 26 and/or intermediate pile 28 and/or multiple-up pile 27, in particular so as to align the same relative to the first knife 18.

The first pile positioning unit 02 comprises at least one upper pressing element 31; 32, which differs from the upper rotary plunger 08, and in particular from the first cutting aid 23, and which can be moved with respect to the vertical direction V and is arranged so as to be movable in and/or counter to the first horizontal direction F by means of the at least one first horizontal drive 09, in particular so as to move a sheet pile 26 in and/or counter to the first horizontal direction F. Preferably, the at least one upper pressing element 31; 32 can be moved with respect to the vertical direction V by means of an upper vertical drive M6. Preferably, the at least one upper pressing element 31; 32 is configured as a gripper upper part 31; 32. In an alternative or additional refinement, the pile cutting device 01 is preferably characterized in that the first pile positioning unit 02 comprises at least two, and more preferably exactly two, such upper pressing elements 31; 32, which differ from the upper rotary plunger 08, and in particular from the first cutting aid 23, and which can be moved with respect to the vertical direction V and are arranged so as to be movable in and/or counter to the first horizontal direction F by means of the at least one first horizontal drive 09, in particular so as to move a sheet pile 26 in and/or counter to the first horizontal direction F. Preferably, the at least two upper pressing elements 31; 32 are configured as gripper upper parts 31; 32.

In an alternative or additional refinement, the pile cutting device 01 is preferably characterized in that the first pile positioning unit 02 comprises at least one lower pressing element 33; 34, which is arranged so as to be movable in and/or counter to the first horizontal direction F by means of at least one, and more preferably by means of the first horizontal drive 09, in particular so as to move a sheet pile 26 in and/or counter to the first horizontal direction F. The at least one lower pressing element 33; 34 is preferably arranged so as to be movable with respect to the vertical direction V. As an alternative, the at least one lower pressing element 33; 34 is arranged so as to be immovable with respect to the vertical direction V. Preferably, the at least one lower pressing element 33; 34 can be moved by means of a lower vertical drive M5 with respect to the vertical direction V. Preferably, the at least one lower pressing element 33; 34 is configured as a gripper lower part 33; 34, in particular regardless of whether it is arranged so as to be movable with respect to the vertical direction V. Preferably, the first pile positioning unit 02 comprises at least two, and still more preferably exactly two, such lower pressing elements 33; 34, which more preferably are configured as gripper lower parts 33; 34, in particular a first lower pressing element 33 and a second lower pressing element 34.

In an alternative or additional refinement, the pile cutting device 01 is preferably characterized in that the first pile positioning unit 02 comprises at least two, and more preferably exactly two, lower pressing elements 33; 34, which are arranged so as to be movable in and/or counter to the first horizontal direction F by means of at least one horizontal drive 09. For example, the at least two, and more preferably exactly two, lower pressing elements 33; 34 can be moved with respect to the vertical direction V.

Preferably, the first bearing device 11 includes at least one lower translation recess 46; 47. This recess is in particular used to be able to arrange the at least one lower pressing element 33; 34 so as to be movable in and/or counter to the first horizontal direction F and bring it in contact with the particular sheet pile 26 and/or intermediate pile 28 and/or multiple-up pile 27. For example, a first lower translation recess 46 is provided for the first lower pressing element 33, and a second lower translation recess 47 is provided for the second lower pressing element 34. Preferably, the lower translation recesses 46; 47 are configured to be slot-shaped. For example, movable cover devices are provided, by means of which those parts of the at least one lower translation recess 46; 47 can be at least partially covered which are in each case not currently needed. In this way, damage to the bottommost layer of the particular sheet pile 26 and/or intermediate pile 28 and/or multiple-up pile 27 can be avoided during pivoting movements. Such cover devices are configured as flaps, roll tops or bands, for example.

In an alternative or additional refinement, the pile cutting device 01 is preferably characterized in that in each case an upper pressing element 31; 32 and a lower pressing element 33; 34 are assigned to one another and together form a respective pile gripper 38; 39, and more preferably in that the respective upper pressing element 31; 32 and the respective lower pressing element 33; 34, which together form a respective pile gripper 38; 39, are arranged so as to be movable together in and/or counter to the first horizontal direction F, in particular by means of the at least one first horizontal drive 09.

In an alternative or additional refinement, the pile cutting device 01 is preferably characterized in that a first upper pressing element 31 is arranged so as to be movable in and/or counter to the first horizontal direction F by means of the first horizontal drive 09, and that a second horizontal drive 41 of the first positioning unit 02 is arranged, and that a second upper pressing element 32 is arranged so as to be movable in and/or counter to the first horizontal direction F by means of this second horizontal drive 41 of the first positioning unit 02, in particular independently of the first upper pressing element 31. In an alternative or additional refinement, the pile cutting device 01 is preferably characterized in that a first pile gripper 38 is arranged so as to be movable in and/or counter to the first horizontal direction F by means of the first horizontal drive 09, and that the second horizontal drive 41 of the first positioning unit 02 is arranged, and that a second pile gripper 39 is arranged so as to be movable in and/or counter to the first horizontal direction F by means of this second horizontal drive 41 of the first positioning unit 02, in particular independently of the first pile gripper 38. In this way, sheet piles 26 and/or intermediate piles 28 and/or multiple-up piles 27 can selectively only be moved with respect to the first horizontal direction F by means at least the upper pressing elements 31; 32 or by means of the pile grippers 38; 39, or can simultaneously also be subjected to a slight pivoting movement about at least one vertical axis, in particular in that the upper pressing elements 31; 32 and/or the pile grippers 38; 39 are moved different distances. Pivoting movements can thus be carried out at least in narrow areas, without activating the upper rotary plunger 08. This possibly results in time savings.

In an alternative or additional refinement, the pile cutting device 01 is preferably characterized in that the first pile positioning unit 02 comprises two first stops 53, of which one is in each case arranged at a respective of the two upper pressing elements 31; 32. In this way, it is also possible to displace sheet piles 26 and/or intermediate piles 28 and/or multiple-up piles 27, without pressing them in the process. These respective stops 53 can, for example, be moved with respect to the vertical direction V, in particular for activating and/or deactivating the same.

In an alternative or additional refinement, the pile cutting device 01 is preferably characterized in that the first pile positioning unit 02 comprises a lower rotary plunger 29, which can be pivoted about the pivot axis 07. An upper contact surface 37 of this lower rotary plunger 39 is preferably arranged no higher than at the height of the first pile bearing surface 04. The first pile bearing surface 04 preferably has a lower rotary plunger recess 06, in which the lower rotary plunger 29 is at least partially arranged. Preferably, the lower rotary plunger 29 is arranged such that the upper contact surface 37 of the lower rotary plunger 29 is situated in the same plane as the first pile bearing surface 04. The lower rotary plunger recess 06 preferably has a circular cross-section. The lower rotary plunger 29 in particular differs from the at least one lower pressing element 33; 34. Preferably, the lower rotary plunger 29 is arranged so as to be pivotable together with the upper rotary plunger 08, in particular by means of the first pivot drive M3. For example, the lower rotary plunger 29 is arranged so as to be movable with respect to the vertical direction V.

In an alternative or additional refinement, the pile cutting device 01 is preferably characterized in that the pile cutting device 01 comprises at least one first upper pressing plate 12, which is arranged so as to be movable with respect to the vertical direction V, in particular by means of a first plate drive M4. This first upper pressing plate 12 is in particular used to press together the sheet pile 26 and/or intermediate pile 28 and/or multiple-up pile 27 to be cut, and to thereby ensure that the individual sheets 71 are stacked as uniformly as possible. This first upper pressing plate 12 is in particular to be distinguished from the upper rotary plunger 08 and from the first cutting aid 23 and from the at least one upper pressing element 31; 32. Preferably, at least a portion of the at least one first upper pressing plate 12 is arranged upstream from the upper rotary plunger 08, based on the first horizontal direction F, and at least a portion of the at least one first upper pressing plate 12 is arranged downstream from the upper rotary plunger 08, based on the first horizontal direction F. Preferably, at least one of the upper rotary plunger 08, based on the first horizontal direction, is arranged between components of the at least one first upper pressing plate 12. The at least one first upper pressing plate 12 preferably has a one-piece design. As an alternative, it is also possible for multiple individual parts to collectively take over the function of the first upper pressing plate 12. However, these should preferably be arranged so as to be movable together. Preferably, maximum contact pressures between 0.5 $mN/mm^2$ (half a millinewton per square millimeter) and 20 $mN/mm^2$ (twenty millinewtons per square millimeter) are exerted by way of the first pressing plate 12. In this way, it can be ensured that the sheets 71 are held sufficiently smoothly.

The first upper pressing plate 12 preferably has an upper rotary plunger recess 51, in which the upper rotary plunger 08 is at least partially and/or at least temporarily arranged. Preferably, the upper rotary plunger 08 is arranged such that the lower contact surface 36 of the upper rotary plunger 08 is at least temporarily situated in the same plane as a lower surface of the upper pressing plate 12. The upper rotary plunger recess 51 preferably has a circular cross-section. Preferably, the first upper pressing plate 12 includes at least one upper translation recess 48; 49. This recess is in particular used to be able to arrange the at least one upper pressing element 31; 32 so as to be movable in and/or counter to the first horizontal direction F and bring it in contact with the particular sheet pile 26 and/or intermediate pile 28 and/or multiple-up pile 27. For example, a first upper translation recess 48 is provided for the first upper pressing element 31, and a second upper translation recess 49 is provided for the second upper pressing element 32. Preferably, the upper translation recesses 48; 49 are configured to be slot-shaped.

In an alternative or additional refinement, the pile cutting device 01 is preferably characterized in that the upper rotary plunger 08 and the respective at least one upper pressing element 31; 32 are situated at a smallest distance with respect to one another, which is no more than 30 mm, more preferably no more than 20 mm, still more preferably no more than 10 mm, still more preferably no more than 5 mm, and still more preferably no more than 2 mm. The closer the at least one upper pressing element 31; 32 is, and in particular the two upper pressing elements 31; 32 are, arranged at the upper rotary plunger 08, the fewer errors can occur during changes in the holding configuration and/or the less likely is the uppermost sheet 71 to detach or wave. Accordingly, the pile cutting device 01 is preferably characterized in that the lower rotary plunger 29 and the respective at least one lower pressing element 33; 34 are situated at a smallest distance with respect to one another, which is no more than 30 mm, more preferably no more than 20 mm, still more preferably no more than 10 mm, still more preferably no more than 5 mm, and still more preferably no more than 2 mm. Depending on the distance, it is possible for the lower rotary plunger recess 06 and the at least one lower translation recess 46; 47 to transition into one another and/or be configured as a shared recess. Depending on the distance, it is possible for the upper rotary plunger recess 51 and the at least one upper translation recess 48; 49 to transition into one another and/or be configured as a shared recess. Preferably, the first upper translation recess 48 is arranged vertically above the first lower translation recess 46 and/or the second upper translation recess 49 is arranged vertically above the second lower translation recess 49.

For example, at least one second pile positioning unit 03 is preferably arranged downstream from the first cutting unit 13 along the intended transport path. For example, the second cutting unit 14 is arranged downstream from the second pile positioning unit 03. Preferably, the second pile positioning unit 03 is assigned to the second cutting unit 14, in particular to be able to align respective intermediate piles 28 in an optimized manner. In an alternative or additional refinement, the pile cutting device 01 is preferably characterized in that the pile cutting device 01 comprises the at least one second pile positioning unit 03, in particular for positioning at least one respective intermediate pile 28. The second pile positioning unit 03 preferably does not comprise any rotary plungers. It is preferably exclusively used to position intermediate piles 28 by way of translation in a second horizontal direction G, which is in particular orthogonal to the first horizontal direction F.

This second cutting unit 14 preferably comprises at least the second knife 19 and the second cutting aid 24. A bearing device is preferably assigned to the second cutting unit 14, which, for example, corresponds to the first bearing device 11 and/or is configured analogously thereto. The second pile positioning unit 03 preferably comprises at least one in particular third horizontal drive 57 for moving at least one intermediate pile 28 and/or multiple-up pile 27 in and/or counter to the second horizontal direction G. This second horizontal direction G is preferably oriented orthogonally to the second cutting edge 22. The at least one in particular third horizontal drive 57 of the second pile positioning unit 02 is preferably used to bring about a translation of the particular sheet pile 26 and/or intermediate pile 28 and/or multiple-up pile 27, in particular so as to align the same relative to the second knife 19.

The second pile positioning unit 03 preferably comprises an upper pressing element 58, which in particular differs from the second cutting aid 24 and which can be moved with respect to the vertical direction V and is arranged so as to be movable in and/or counter to the second horizontal direction G by means of the at least one in particular third horizontal drive 57 of the second pile positioning unit 03. Preferably, the at least one upper pressing element 58 is configured as a gripper upper part 58.

In an alternative or additional refinement, the pile cutting device 01 is preferably characterized in that the second pile positioning unit 02 comprises at least one lower pressing element 59, which is preferably arranged so as to be movable in and/or counter to the second horizontal direction G by means of the at least one in particular third horizontal drive 57 of the second pile positioning unit 03, in particular so as to move an intermediate pile 28 in and/or counter to the second horizontal direction G. The at least one lower pressing element 59 is preferably arranged so as to be movable with respect to the vertical direction V. Preferably, the at least one lower pressing element 59 is configured as a gripper lower part 59. Preferably, the bearing device includes at least one lower translation recess 61. This recess is used in particular to be able to arrange the at least one lower pressing element 59 so as to be movable in and/or counter to the second horizontal direction G and bring it in contact with the particular intermediate pile 28.

In an alternative or additional refinement, the second pile positioning unit 03 is preferably characterized in that the upper pressing element 58 and the lower pressing element 59 are assigned to one another and together form a pile gripper 62, and more preferably are arranged so as to be movable together in and/or counter to the second horizontal direction G, in particular by means of the at least one in particular third horizontal drive 57.

In an alternative or additional refinement, the pile cutting device 01 is preferably characterized in that the first pile positioning unit 02 comprises a respective stop 63, which is arranged at the upper pressing element 58. In this way, it is also possible to displace intermediate piles 28 and/or multiple-up piles 27, without pressing them in the process. This particular stop 63 can, for example, be moved with respect to the vertical direction V, in particular for activating and/or deactivating the same.

In an alternative or additional refinement, the pile cutting device 01 is preferably characterized in that the second cutting unit 14 comprises at least one second upper pressing plate 64, which is arranged so as to be movable with respect to the vertical direction V. This second upper pressing plate 64 is in particular used to press together the sheet pile 26 and/or intermediate pile 28 to be cut, and to thereby ensure that the individual sheets 71 are stacked as uniformly as possible. This second upper pressing plate 64 is in particular to be distinguished from the second cutting aid 24 and from the at least one upper pressing element 58. The at least one second upper pressing plate 64 preferably has a one-piece design. As an alternative, it is also possible for multiple individual parts to collectively take over the function of the second upper pressing plate 64. However, these should preferably be arranged so as to be movable together. Preferably, maximum contact pressures between 0.5 $mN/mm^2$ (half a millinewton per square millimeter) and 20 $mN/mm^2$ (twenty millinewtons per square millimeter) are exerted by way of the second upper pressing plate 64. In this way, it can be ensured that the sheets 71 are held sufficiently smoothly.

Preferably, the second upper pressing plate 64 includes at least one upper translation recess 66. This recess is in particular used to be able to arrange the at least one upper pressing element 58 so as to be movable in and/or counter to the second horizontal direction G and bring it in contact with the particular sheet pile 26 and/or intermediate pile 28 and/or multiple-up pile 27. Preferably, the at least one upper translation recess 66 is configured to be slot-shaped. Preferably, the upper translation recess 61 is arranged vertically above the lower translation recess 66.

In an alternative or additional refinement, the pile cutting device 01 is preferably characterized in that the second cutting unit 14 comprises at least two or at least three second pile positioning units 03, which are in particular arranged next to one another, based on the first horizontal direction F, and which are preferably all assigned to the same second knife 19. In this way, the throughput of the pile cutting device 01 can be increased.

In an alternative or additional refinement, the pile cutting device 01 is preferably characterized in that the first cutting unit 13 has a first effective working width, which is at least 800 mm, and more preferably at least 850 mm, and still more preferably at least 900 mm and/or that the second cutting unit 14 has a second effective working width, which is no more than 500 mm, and more preferably no more than 400 mm, and still more preferably no more than 350 mm, and which is at least 50 mm, and more preferably at least 100 mm, and still more preferably at least 150 mm. The working width of the first cutting unit 13 is preferably greater than the working width of the second cutting unit 14.

The pile cutting device 01 is preferably a pile cutting device 01 for generating security piles 27. Such security piles 27 and/or the underlying sheet piles 26 preferably have a height that is at least 10 mm, more preferably at least 20 mm and/or that is preferably no more than 80 mm, more preferably no more than 60 mm, still more preferably no more than 50 mm. In an adapted embodiment, it is also possible for piles of labels and/or piles of business cards to be generated. The sheet piles 26 and/or intermediate piles 28 and/or multiple-up piles 27 then preferably have a height that is at least 70 mm, more preferably at least 100 mm and/or that is preferably no more than 200 mm, more preferably no more than 180 mm, and still more preferably no more than 160 mm.

Figures 7A, 7B, 7C, 7D, 7E:
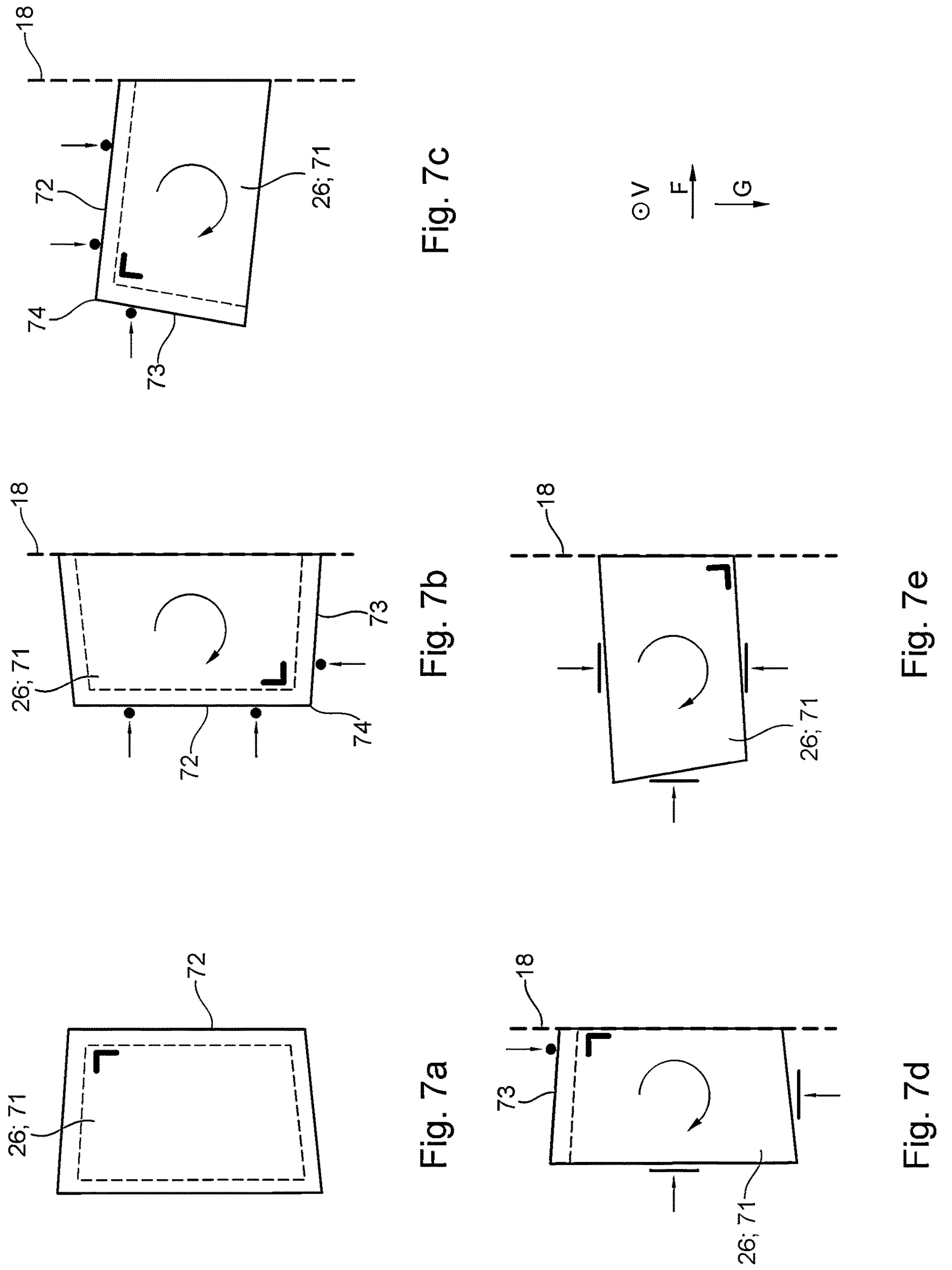
FIG. 7*a* a schematic representation of a pile of sheets in an uncut state.
FIG. 7*b* a schematic representation of a pile of sheets according to FIG. 7*a* in a rotated state in which it is trimmed on one side.
FIG. 7*c* a schematic representation of a pile of sheets according to FIG. 7*a* in a rotated state in which it is trimmed on two sides.
FIG. 7*d* a schematic representation of a pile of sheet according to FIG. 7*a* in a rotated state in which it is trimmed on three sides.
FIG. 7*e* a schematic representation of a pile of sheets according to FIG. 7*a* in a rotated state in which it is trimmed on all sides.
Figure 7G:
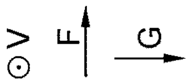
FIG. 7*g* a schematic representation of a pile of sheets according to FIG. 7*a* and of two intermediate piles that have already been cut off therefrom.
Figure 7G:
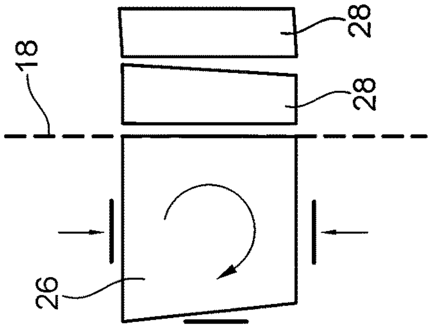
Figure 7I:
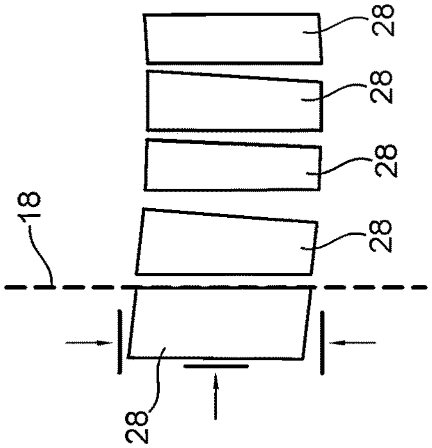
FIG. 7*i* a schematic representation of five intermediate piles which resulted from a pile of sheets according to FIG. 7*a;*
Figure 7F:
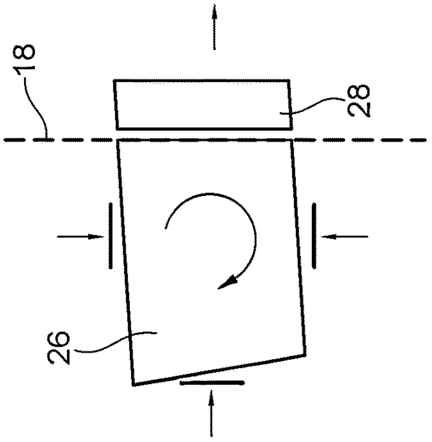
FIG. 7*f* a schematic representation of a pile of sheets according to FIG. 7*a* and of an intermediate pile that has already been cut off therefrom.
Figure 7H:
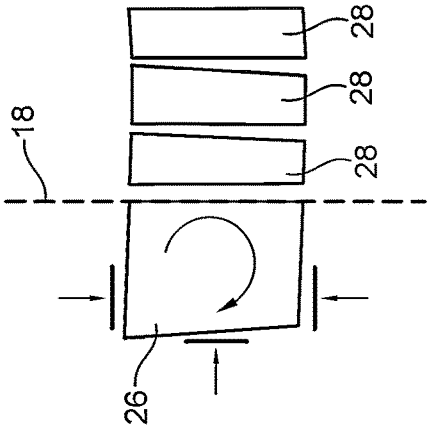
FIG. 7*h* a schematic representation of a pile of sheet according to FIG. 7*a* and of three intermediate piles that have already been cut off therefrom.

Using the pile cutting device 01, it is possible to carry out a method for cutting a sheet pile 26 by means of a pile cutting device 01. The sheet pile 26 initially rests on a first pile bearing surface 04 of a first bearing device 11. The sheet pile 26 is, for example, initially placed such that a front gripper edge 72 is situated at the front, as viewed in the direction of the transport path. (This is also shown by way of example in FIG. 7*a*.) Preferably, initially the four edges are trimmed. It is advantageous in the process when the corner 74 that connects the front gripper edge 72 of the sheets 71 to a lateral gripper edge 73 of the sheets 71 serves as a reference and is only changed by way of the last two cuts. For this reason, the sheet pile 26 is initially rotated by 180° and is then transported into the first cutting unit 13. (This is also shown by way of example in FIG. 7*b*.) There, the first edge is then preferably cut off. Thereafter, a rotation of the pile by 90° or slightly more is preferably carried out. If necessary, a translational movement of the sheet pile 26 is now carried out, so as to correctly set the position of the sheet pile 26 relative to the first knife 18. Thereafter, a first side edge can be cut off. (This is also shown by way of example in FIG. 7*c*.) Thereafter, preferably another rotation of the sheet pile 26 by 90° or slightly less is carried out. For example, the front gripper edge 72 is now located at the front, as viewed in the direction of the transport path, and can be cut off after a translational movement of the sheet pile 26 for correcting the position. (This is also shown by way of example in FIG. 7*d*.) Thereafter, preferably another rotation of the sheet pile 26 by 90° or slightly less is carried out. Following another translational movement, the lateral gripper edge 73 can now be cut off. (This is also shown by way of example in FIG. 7*e*.) For example, the pile sheet 26 was cut in this way into a trapezoidal shape that is not very pronounced. The rotational movements described above are carried out, for example, by means of the at least one rotary plunger 08; 29.

Thereafter, for example, the sheet pile 26 is cut into multiple intermediate piles 28. For this purpose, for example, the sheet pile 26 is transported in the first horizontal direction F. If necessary, it is rotated slightly beforehand and/or thereafter and/or during this process. A rotation beforehand or thereafter can take place by means of the at least one rotary plunger 08; 29, for example. A rotational movement during the transport in the first horizontal direction F can, for example, take place by irregular forward-feeding, in particular by different distances, by means of the two upper pressing elements 31; 32 and/or the two pile grippers 38; 39. It is thus preferred that, in at least one operation of the method, in particular a forward-feed operation, the sheet pile 26 is moved in or counter to the first horizontal direction F by means of the at least two upper pressing elements 31; 32, and in the process its orientation is changed in that the at least two upper pressing elements 31; 33 are moved different distances in or counter to the first horizontal direction F while they move the sheet pile 26. Thereafter, an intermediate pile 28 is cut off. The sequence of forward feeding and cutting off, with possibly a rotation carried out in between, preferably takes place consecutively multiple times, so that ultimately the entire sheet pile 26 is divided into multiple intermediate piles 28. (This is also shown by way of example in FIG. 7*f* to FIG. 7*i*.) These intermediate piles 28, for example, have a slightly trapezoidal design and/or can then be cut into multiple-up piles 27, in particular security piles 27, by means of the at least one second cutting unit 14.

Figure 8B:
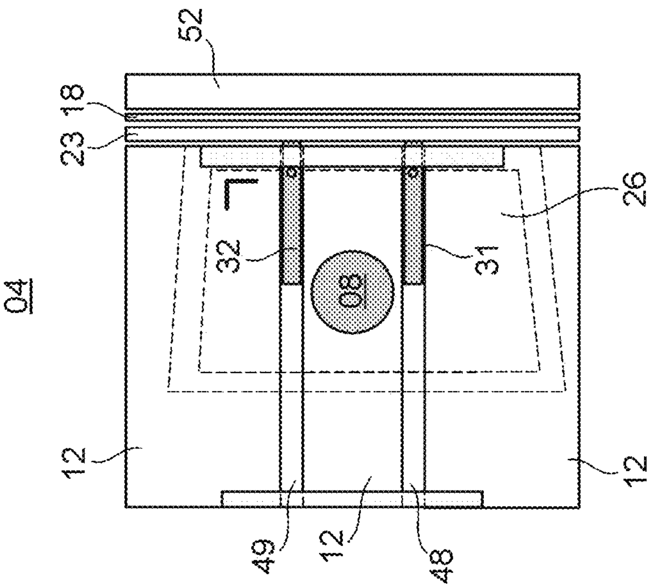
FIG. 8*b* a schematic top view according to FIG. 8*a* in an operating state in which the pile of sheets is being held by means of a rotary plunger and pressing elements.
Figure 8A:
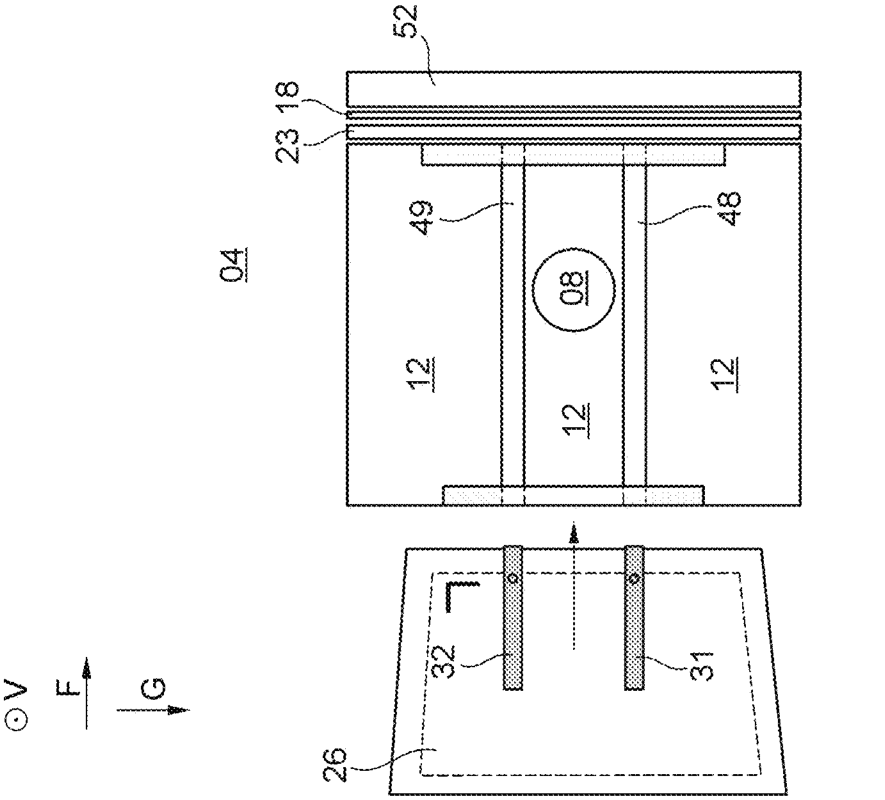
FIG. 8*a* a schematic top view onto a first pile positioning unit, a first cutting unit and a pile of sheets in an operating state in which the pile of sheets is being fed.

The method will be described in greater detail hereafter, for example using the preferred pile cutting device 01. In a first forward-feed operation, the sheet pile 26 is moved in or counter to the first horizontal direction F pointing from the upper pressing elements 31; 32 at a first cutting unit 13 by means of at least two upper pressing elements 31; 32 acting vertically from above on the sheet pile 26. A beginning of this first forward-feed operation is also shown in FIG. 8*a* by way of example. In FIG. 8*a*, the sheet pile 26, apart from the first pile bearing surface 04, is preferably only fixed and/or pressed by the pile grippers 38; 39. This situation shown in FIG. 8*a* essentially also corresponds to the situation shown in FIG. 7*a*. An end of this forward-feed operation would correspond to an illustration similar to FIG. 8*b*. Preferably, an upper rotary plunger 08 is lowered thereafter, in a first lowering operation, such that its lower contact surface 36 makes contact with the sheet pile 26. The result of the first lowering operation is also shown in FIG. 8*b* by way of example. In FIG. 8*b*, the sheet pile 26, apart from the first pile bearing surface 04, is preferably fixed and/or pressed both by the upper pressing elements 31; 32 and/or the pile grippers 38; 39 and by the at least one rotary plunger 08; 29. Preferably, the at least two upper pressing elements 31; 32 are moved upwardly, in particular thereafter in a first release operation, and lifted off the sheet pile 26. Apart from the first pile bearing surface 04, the sheet pile 26 is now preferably only fixed and/or pressed by the at least one rotary plunger 08; 29.

Figure 8E:
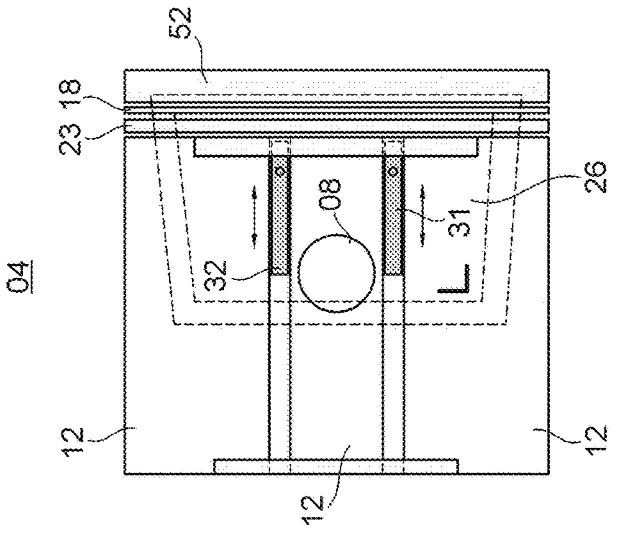
FIG. 8*e* a schematic top view according to FIG. 8*a* in an operating state in which the pile of sheets has been linearly moved and is being held by means of the pressing elements.
Figure 8D:
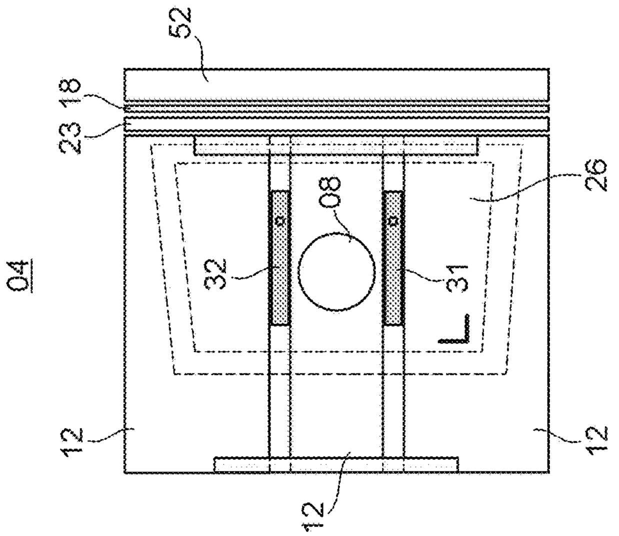
FIG. 8*d* a schematic top view according to FIG. 8*a* in an operating state in which the pile of sheets is being held by means of a rotary plunger and pressing elements.
Figure 8C:
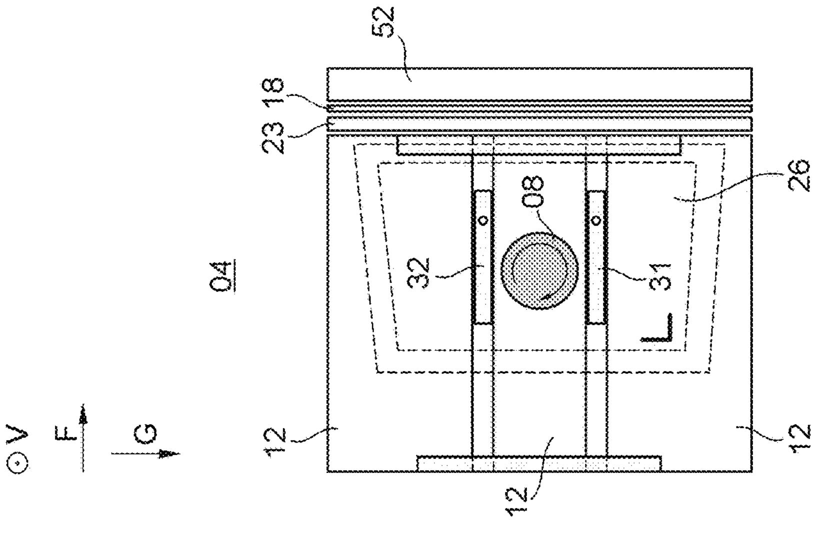
FIG. 8*c* a schematic top view according to FIG. 8*a* in an operating state in which the pile of sheets has been rotated and is being held by means of the rotary plunger.

Preferably, the upper rotary plunger 08 is pivoted about a vertical pivot axis 07, in particular thereafter in a first pivoting operation, whereby the sheet pile 26 is pivoted about the vertical pivot axis 07. The result of the first pivoting operation is also shown in FIG. 8*c* by way of example. In FIG. 8*c*, the sheet pile 26, apart from the first pile bearing surface 04, is preferably only fixed and/or pressed by the at least one rotary plunger 08; 29.

Preferably, the at least two upper pressing elements 31; 32 are moved downwardly, in particular thereafter in a second lowering operation, and are brought in contact with the sheet pile 26. The result of the second lowering operation is also shown in FIG. 8*d* by way of example. In FIG. 8*d*, the sheet pile 26, apart from the first pile bearing surface 04, is preferably fixed and/or pressed both by the upper pressing elements 31; 32 and/or the pile grippers 38; 39 and by the at least one rotary plunger 08; 29.

Preferably, the upper rotary plunger 08 is moved upwardly, in particular thereafter in a second release operation, and is lifted off the sheet pile 26. Preferably, the sheet pile 26 is moved, in particular thereafter in a second forward-feed operation, in or counter to the first horizontal direction F by means of the at least two upper pressing elements 31; 32 acting in particular vertically from above on the sheet pile 26. The result of this second forward-feed operation is also shown in FIG. 8*e* by way of example. In FIG. 8*e*, the sheet pile 26, apart from the first pile bearing surface 04, is preferably only fixed and/or pressed by the pile grippers 38; 39.

Figure 8H:
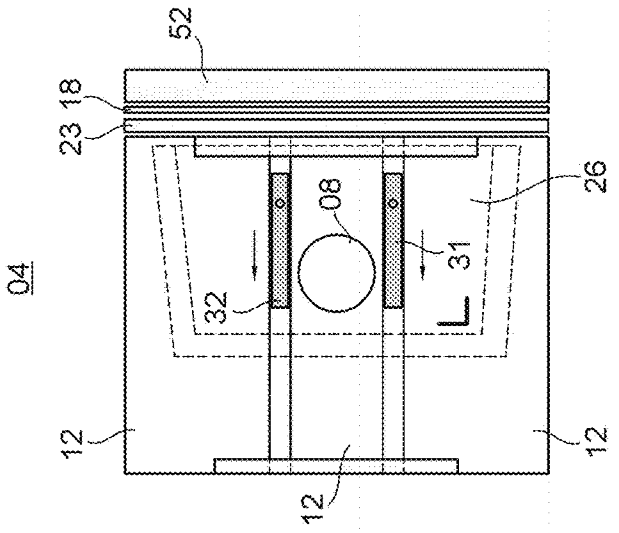
FIG. 8*h* a schematic top view according to FIG. 8*a* in an operating state in which the pile of sheets has been linearly moved and is being held by means of the pressing elements.
Figure 8G:
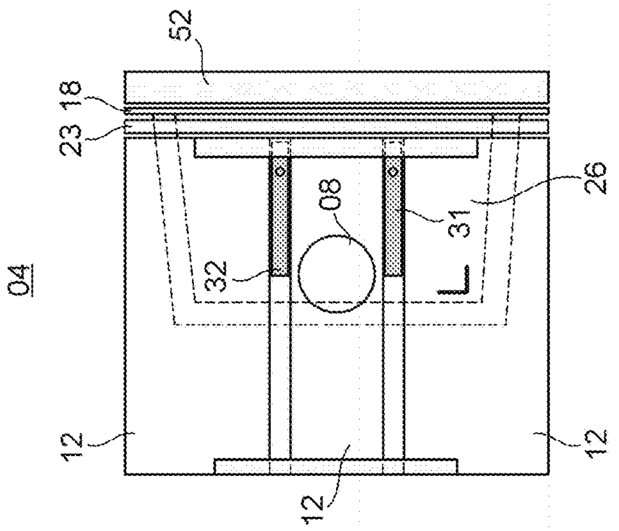
FIG. 8*g* a schematic top view according to FIG. 8*a* in an operating state in which the pile of sheets has been cut and is being held by means of the pressing elements.
Figure 8F:
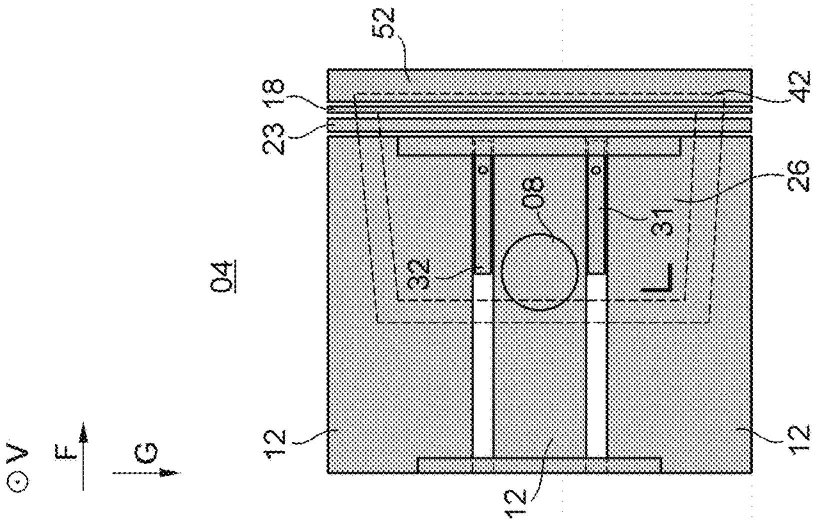
FIG. 8*f* a schematic top view according to FIG. 8*a* in an operating state in which the pile of sheets is being held by means of the rotary plunger, the pressing elements and a pressing plate.

Preferably, the upper rotary plunger 08 and/or a first upper pressing plate 12 are lowered from above onto the sheet pile 26, in particular after the second forward-feed operation and prior to a first cutting operation, in a first smooth-pressing operation, and are brought in contact therewith. The result of the first smooth-pressing operation is also shown in FIG. 8*f* by way of example. In FIG. 8*f*, the sheet pile 26, apart from the first pile bearing surface 04, is preferably fixed and/or pressed both by the upper pressing elements 31; 32 and/or the pile grippers 38; 39, and by the at least one rotary plunger 08; 29 and the upper pressing plate 12. In this situation, which is thus in particular chronologically after the second forward-feed operation, a partial pile 42 is preferably cut off the sheet pile 16 in the first cutting operation by means of the first cutting unit 13. This partial pile 42 corresponds, for example, to an edge region that is removed when the edge is trimmed.

Preferably, the upper rotary plunger 08 and the first upper pressing plate 12 are moved upwardly in a third release operation, in particular after the first cutting operation, and are lifted off the sheet pile 26. The result of the third release operation is also shown in FIG. 8*g* by way of example. In FIG. 8*g*, the sheet pile 26, apart from the first pile bearing surface 04, is preferably only fixed and/or pressed by the pile grippers 38; 39.

Preferably, the sheet pile 26 is moved, in particular thereafter in a third forward-feed operation, in or counter to the first horizontal direction F by means of the at least two upper pressing elements 31; 32 acting in particular vertically from above on the sheet pile 26. The result of this third forward-feed operation is also shown in FIG. 8*h* by way of example. In FIG. 8*h*, the sheet pile 26, apart from the first pile bearing surface 04, is preferably only fixed and/or pressed by the pile grippers 38; 39.

Figure 8I:
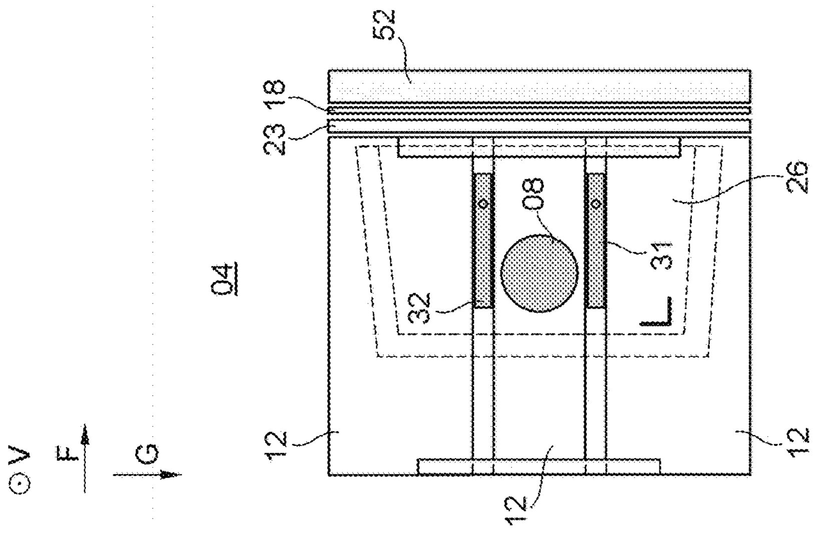
FIG. 8*i* a schematic top view according to FIG. 8*a* in an operating state in which the pile of sheets is being held by means of a rotary plunger and pressing elements.

Preferably, the upper rotary plunger 08 is lowered thereafter, in a third lowering operation, such that its lower contact surface 36 makes contact with the sheet pile 26. The result of the first lowering operation is also shown in FIG. 8*i* by way of example. In FIG. 8*i*, the sheet pile 26, apart from the first pile bearing surface 04, is preferably fixed and/or pressed both by the upper pressing elements 31; 32 and/or the pile grippers 38; 39 and by the at least one rotary plunger 08; 29.

Preferably, the at least two upper pressing elements 31; 32 are moved upwardly, in particular thereafter in a fourth release operation, and lifted off the sheet pile 26. Apart from the first pile bearing surface 04, the sheet pile 26 is now preferably only fixed and/or pressed by the at least one rotary plunger 08; 29.

Figure 8J:
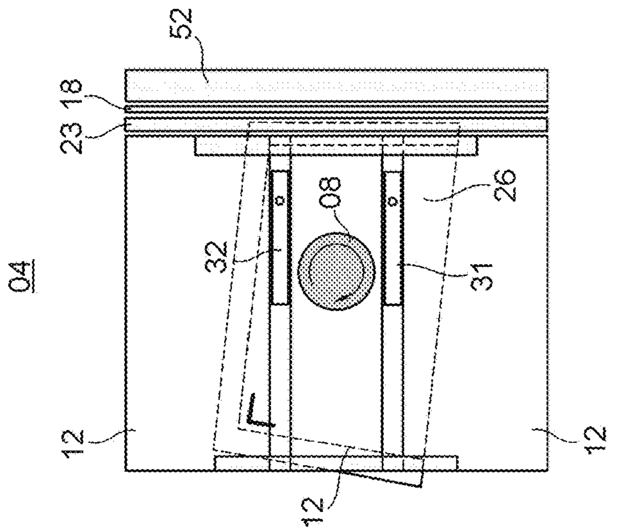
FIG. 8*j* a schematic top view according to FIG. 8*a* in an operating state in which the pile of sheets has been rotated and is being held by means of the rotary plunger.

Preferably, the upper rotary plunger 08 is pivoted about a vertical pivot axis 07, in particular thereafter in a second pivoting operation, whereby the sheet pile 26 is pivoted about the vertical pivot axis 07. The result of the first pivoting operation is also shown in FIG. 8*j* by way of example. In FIG. 8*j*, the sheet pile 26, apart from the first pile bearing surface 04, is preferably only fixed and/or pressed by the at least one rotary plunger 08; 29.

Figure 8K:
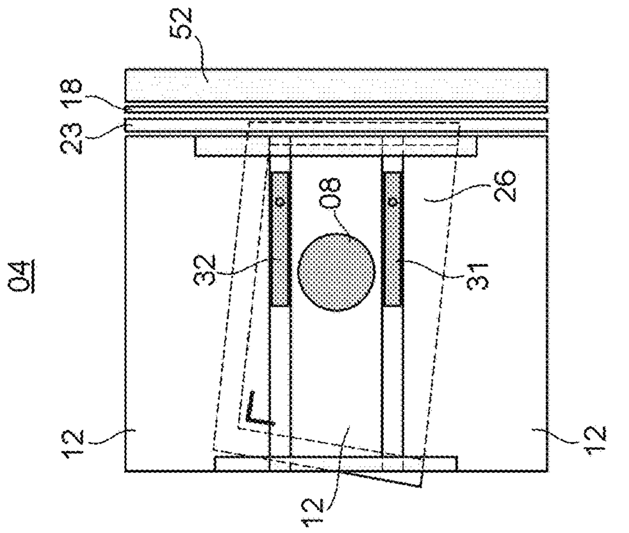
FIG. 8*k* a schematic top view according to FIG. 8*a* in an operating state in which the pile of sheets is being held by means of a rotary plunger and pressing elements.

Preferably, the at least two upper pressing elements 31; 32 are moved downwardly, in particular thereafter in a fourth lowering operation, and are brought in contact with the sheet pile 26. The result of the fourth lowering operation is also shown in FIG. 8*k* by way of example. In FIG. 8*k*, the sheet pile 26, apart from the first pile bearing surface 04, is preferably fixed and/or pressed both by the upper pressing elements 31; 32 and/or the pile grippers 38; 39 and by the at least one rotary plunger 08; 29.

Figure 8N:
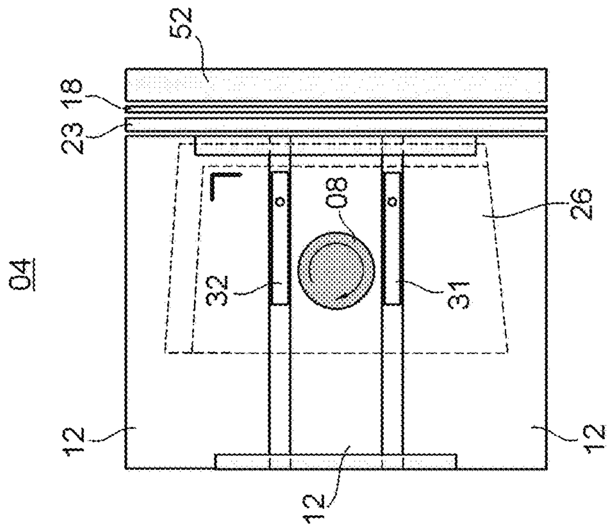
FIG. 8*n* a schematic top view according to FIG. 8*a* in an operating state in which the pile of sheets has been rotated and is being held by means of the rotary plunger.
Figure 8M:
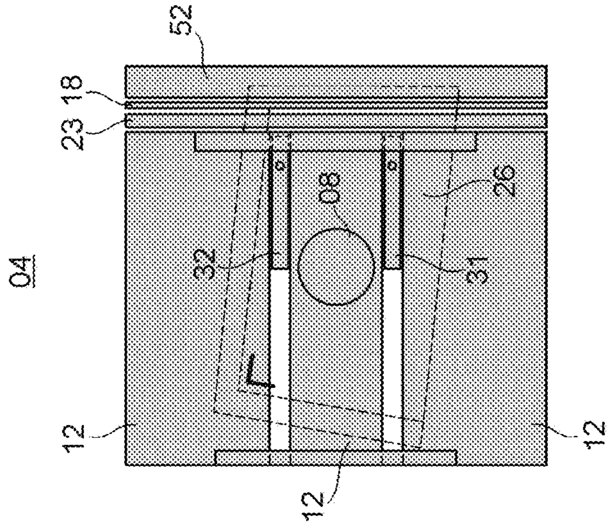
FIG. 8*m* a schematic top view according to FIG. 8*a* in an operating state in which the pile of sheets is being held by means of the rotary plunger, the pressing elements and a pressing plate.
Figure 8L:
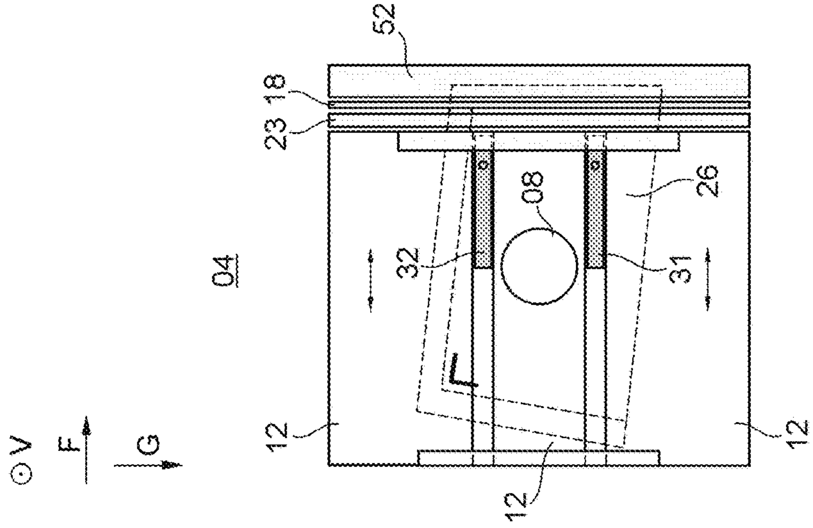
FIG. 8*l* a schematic top view according to FIG. 8*a* in an operating state in which the pile of sheets has been linearly moved and is being held by means of the pressing elements.

Preferably, the upper rotary plunger 08 is moved upwardly, in particular thereafter in a fifth release operation, and is lifted off the sheet pile 26. Preferably, the sheet pile 26 is moved, in particular thereafter in a fourth forward-feed operation, in or counter to the first horizontal direction F by means of the at least two upper pressing elements 31; 32 acting in particular vertically from above on the sheet pile 26. The result of this fourth forward-feed operation is also shown in FIG. 8*l* by way of example. In FIG. 8*l*, the sheet pile 26, apart from the first pile bearing surface 04, is preferably only fixed and/or pressed by the pile grippers 38; 39.

Preferably, the upper rotary plunger 08 and/or a first upper pressing plate 12 are lowered from above onto the sheet pile 26, in particular thereafter in a second smooth-pressing operation, and are brought in contact therewith. The result of the second smooth-pressing operation is also shown in FIG. 8*m* by way of example. In FIG. 8*m*, the sheet pile 26, apart from the first pile bearing surface 04, is preferably fixed and/or pressed both by the upper pressing elements 31; 32 and/or the pile grippers 38; 39 and by the at least one rotary plunger 08; 29 and the upper pressing plate 12. Preferably, a partial pile 42 is cut off the sheet pile 16, in particular thereafter in a second cutting operation, by means of the first cutting unit 13. This partial pile 42 corresponds, for example, to an in particular second edge region that is removed when the edge is trimmed.

Preferably, the at least two upper pressing elements 31; 32 and the first upper pressing plate 12 are moved upwardly, in particular after the second cutting operation, in a sixth release operation, and are lifted off the sheet pile 26.

Preferably, the upper rotary plunger 08 is pivoted about a vertical pivot axis 07, in particular thereafter in a fifth pivoting operation, whereby the sheet pile 26 is pivoted about the vertical pivot axis 07. The result of the fifth pivoting operation is also shown in FIG. 8*n* by way of example. In FIG. 8*n*, the sheet pile 26, apart from the first pile bearing surface 04, is preferably only fixed and/or pressed by the at least one rotary plunger 08; 29.

Figure 8O:
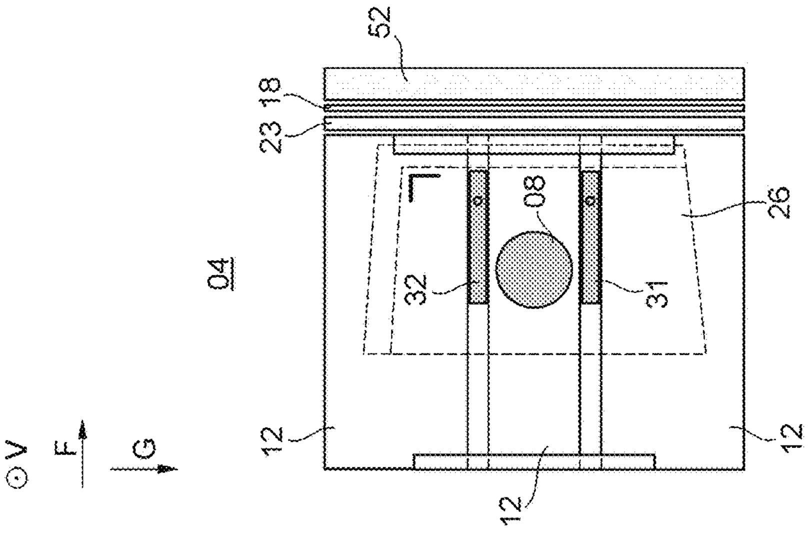
FIG. 8*o* a schematic top view according to FIG. 8*a* in an operating state in which the pile of sheets is being held by means of a rotary plunger and pressing elements.

Preferably, the at least two upper pressing elements 31; 32 are moved downwardly, in particular thereafter in a fifth lowering operation, and are brought in contact with the sheet pile 26. The result of the fifth lowering operation is also shown in FIG. 8*o* by way of example. In FIG. 8*o*, the sheet pile 26, apart from the first pile bearing surface 04, is preferably fixed and/or pressed both by the upper pressing elements 31; 32 and/or the pile grippers 38; 39 and by the at least one rotary plunger 08; 29.

Figure 8P:
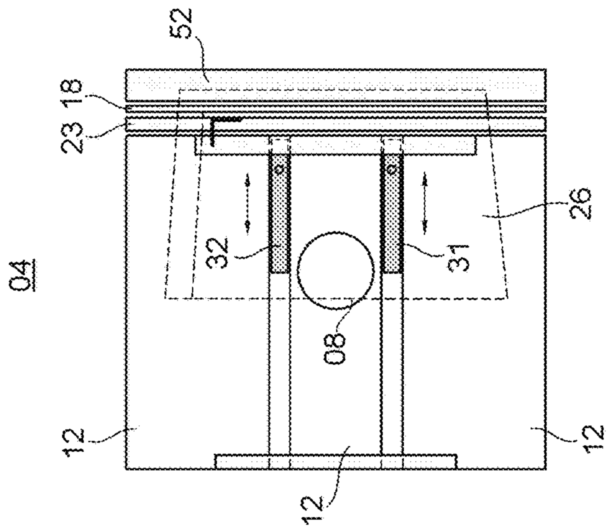
FIG. 8*p* a schematic top view according to FIG. 8*a* in an operating state in which the pile of sheets has been linearly moved and is being held by means of the pressing elements.

Preferably, the upper rotary plunger 08 is moved upwardly, in particular thereafter in a seventh release operation, and is lifted off the sheet pile 26. Preferably, the sheet pile 26 is moved, in particular thereafter in a fifth forward-feed operation, in or counter to the first horizontal direction F by means of the at least two upper pressing elements 31; 32 acting in particular vertically from above on the sheet pile 26. The result of this fifth forward-feed operation is also shown in FIG. 8*p* by way of example. In FIG. 8*p*, the sheet pile 26, apart from the first pile bearing surface 04, is preferably only fixed and/or pressed by the pile grippers 38; 39.

Figure 8Q:
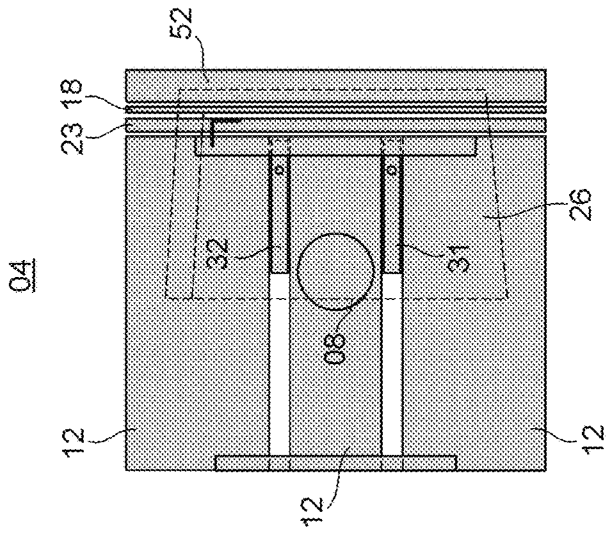
FIG. 8*q* a schematic top view according to FIG. 8*a* in an operating state in which the pile of sheets is being held by means of the rotary plunger, the pressing elements and a pressing plate.

Preferably, the upper rotary plunger 08 and/or a first upper pressing plate 12 are lowered from above onto the sheet pile 26, in particular thereafter in a third smooth-pressing operation, and are brought in contact therewith. The result of the third smooth-pressing operation is also shown in FIG. 8*q* by way of example. In FIG. 8*q*, the sheet pile 26, apart from the first pile bearing surface 04, is preferably fixed and/or pressed both by the upper pressing elements 31; 32 and/or the pile grippers 38; 39 and by the at least one rotary plunger 08; 29 and the first upper pressing plate 12. Preferably, a partial pile 42 is cut off the sheet pile 16, in particular thereafter in a third cutting operation, by means of the first cutting unit 13. This partial pile 42 corresponds, for example, to an in particular third edge region that is removed when the edge is trimmed.

Figure 8R:
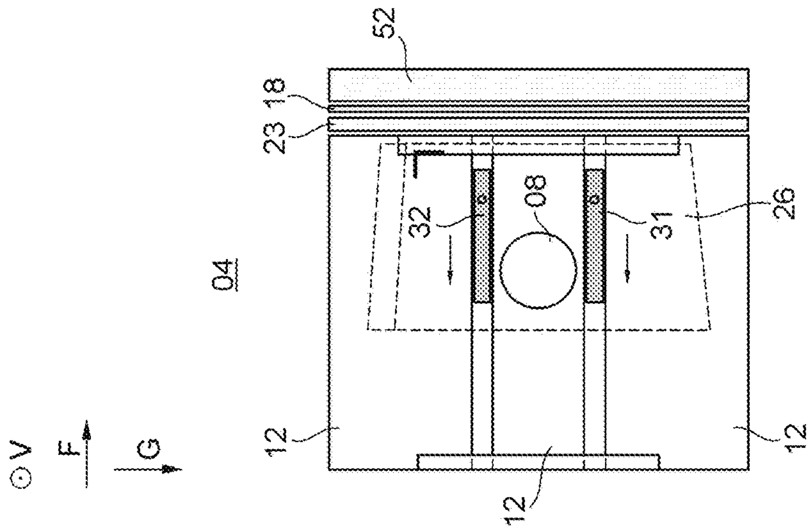
FIG. 8*r* a schematic top view according to FIG. 8*a* in an operating state in which the pile of sheets has been linearly moved and is being held by means of the pressing elements.

Preferably, the upper rotary plunger 08 is moved upwardly, in particular thereafter in an eighth release operation, and is lifted off the sheet pile 26. Preferably, the sheet pile 26 is moved, in particular thereafter in a sixth forward-feed operation, in or counter to the first horizontal direction F by means of the at least two upper pressing elements 31; 32 acting in particular vertically from above on the sheet pile 26. The result of this sixth forward-feed operation is also shown in FIG. 8*r* by way of example. In FIG. 8*r*, the sheet pile 26, apart from the first pile bearing surface 04, is preferably only fixed and/or pressed by the pile grippers 38; 39.

Figure 8S:
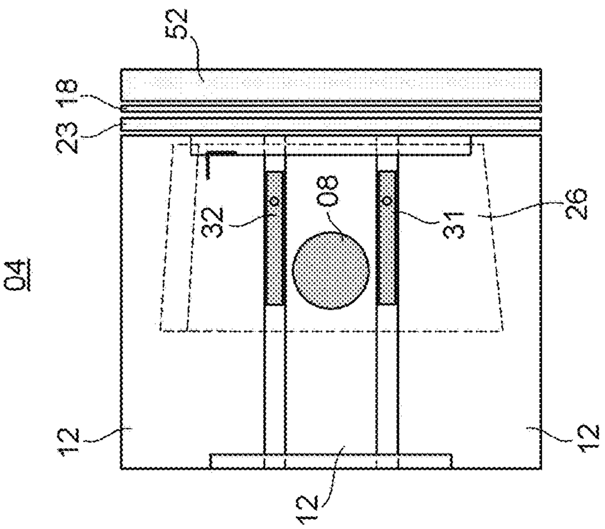
FIG. 8*s* a schematic top view according to FIG. 8*a* in an operating state in which the pile of sheets is being held by means of a rotary plunger and pressing elements.

Preferably, the upper rotary plunger 08 is lowered thereafter, in a sixth lowering operation, such that its lower contact surface 36 makes contact with the sheet pile 26. The result of the sixth lowering operation is also shown in FIG. 8*s* by way of example. In FIG. 8*s*, the sheet pile 26, apart from the first pile bearing surface 04, is preferably fixed and/or pressed both by the upper pressing elements 31; 32 and/or the pile grippers 38; 39 and by the at least one rotary plunger 08; 29.

Figure 8T:
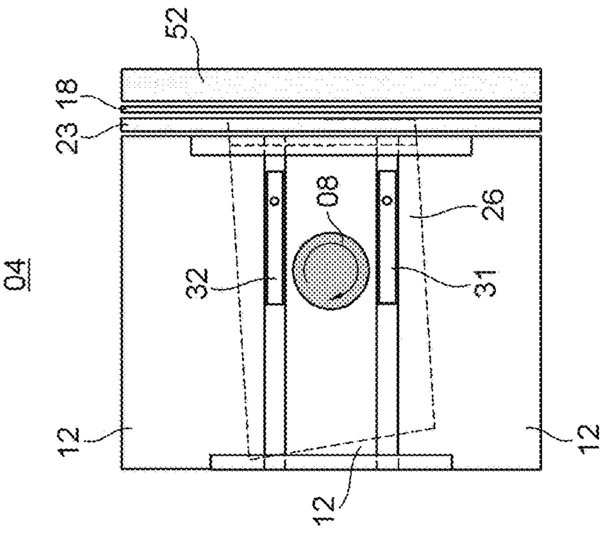
FIG. 8*t* a schematic top view according to FIG. 8*a* in an operating state in which the pile of sheets has been rotated and is being held by means of the rotary plunger.

Preferably, the at least two upper pressing elements 31; 32 are moved upwardly, in particular thereafter in a ninth release operation, and are lifted off the sheet pile 26. Apart from the first pile bearing surface 04, the sheet pile 26 is now preferably only fixed and/or pressed by the at least one rotary plunger 08; 29. Preferably, the upper rotary plunger 08 is pivoted about a vertical pivot axis 07, in particular thereafter in a fourth pivoting operation, whereby the sheet pile 26 is pivoted about the vertical pivot axis 07. The result of the first pivoting operation is also shown in FIG. 8*t* by way of example. In FIG. 8*t*, the sheet pile 26, apart from the first pile bearing surface 04, is now preferably only fixed and/or pressed by the at least one rotary plunger 08; 29.

Figure 8W:
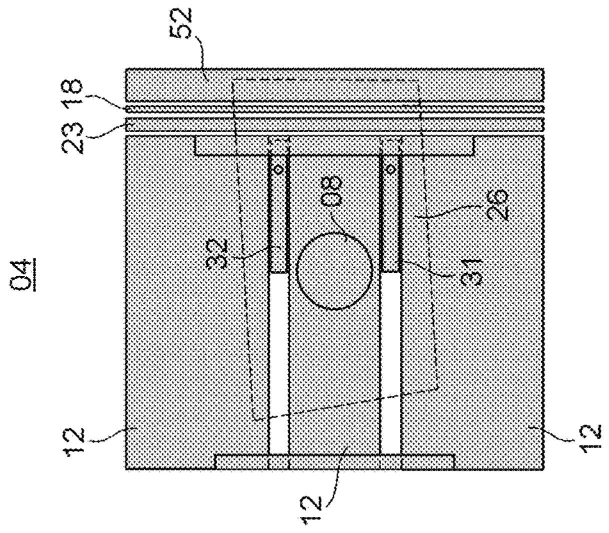
FIG. 8*w* a schematic top view according to FIG. 8*a* in an operating state in which the pile of sheets is being held by means of the rotary plunger, the pressing elements and a pressing plate.
Figure 8V:
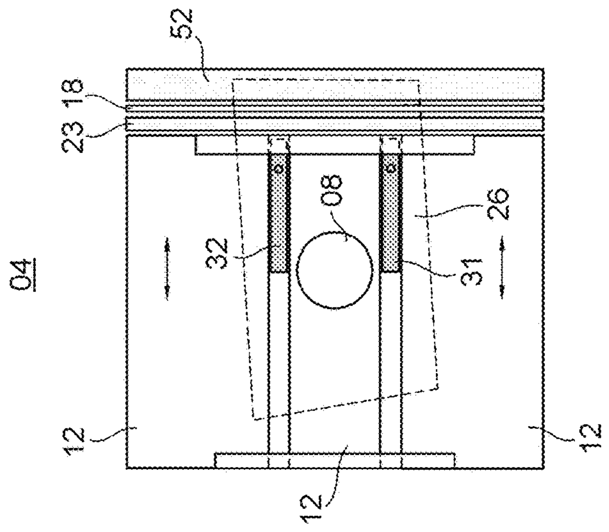
FIG. 8*v* a schematic top view according to FIG. 8*a* in an operating state in which the pile of sheets has been linearly moved and is being held by means of the pressing elements.
Figure 8U:
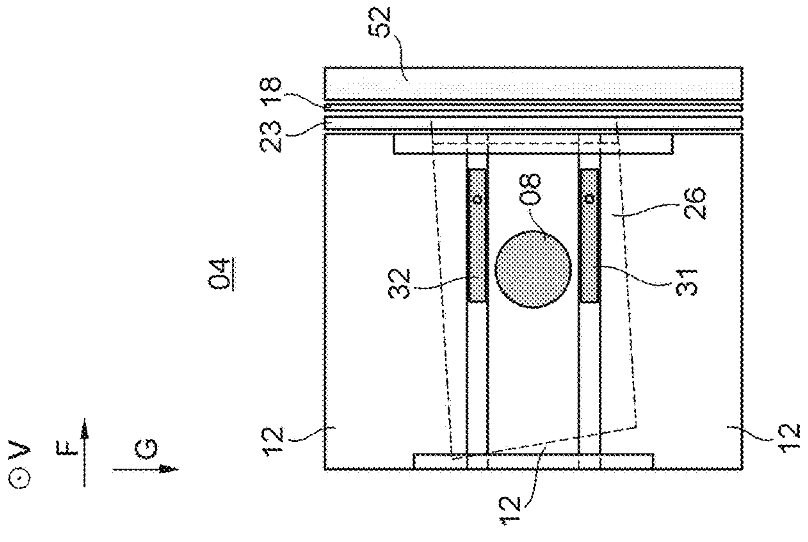
FIG. 8*u* a schematic top view according to FIG. 8*a* in an operating state in which the pile of sheets is being held by means of a rotary plunger and pressing elements.

Preferably, the at least two upper pressing elements 31; 32 are moved downwardly, in particular thereafter in a seventh lowering operation, and are brought in contact with the sheet pile 26. The result of the seventh lowering operation is also shown in FIG. 8*u* by way of example. In FIG. 8*u*, the sheet pile 26, apart from the first pile bearing surface 04, is preferably fixed and/or pressed both by the upper pressing elements 31; 32 and/or the pile grippers 38; 39 and by the at least one rotary plunger 08; 29.

Preferably, the upper rotary plunger 08 is moved upwardly, in particular thereafter in a tenth release operation, and is lifted off the sheet pile 26. Preferably, the sheet pile 26 is moved, in particular thereafter in a seventh forward-feed operation, in or counter to the first horizontal direction F by means of the at least two upper pressing elements 31; 32 acting in particular vertically from above on the sheet pile 26. The result of this seventh forward-feed operation is also shown in FIG. 8*v* by way of example. In FIG. 8*v*, the sheet pile 26, apart from the first pile bearing surface 04, is preferably only fixed and/or pressed by the pile grippers 38; 39.

Preferably, the upper rotary plunger 08 and/or a first upper pressing plate 12 are lowered from above onto the sheet pile 26, in particular thereafter in a fourth smooth-pressing operation, and are brought in contact therewith. The result of the fourth smooth-pressing operation is also shown in FIG. 8*w* by way of example. In FIG. 8*w*, the sheet pile 26, apart from the first pile bearing surface 04, is preferably fixed and/or pressed both by the upper pressing elements 31; 32 and/or the pile grippers 38; 39 and by the at least one rotary plunger 08; 29 and the first upper pressing plate 12. Preferably, a partial pile 42 is cut off the sheet pile 16, in particular thereafter in a fourth cutting operation, by means of the first cutting unit 13. This partial pile 42 corresponds, for example, to an in particular fourth edge region that is removed when the edge is trimmed.

Figures 8X, 8Y, 8Z:
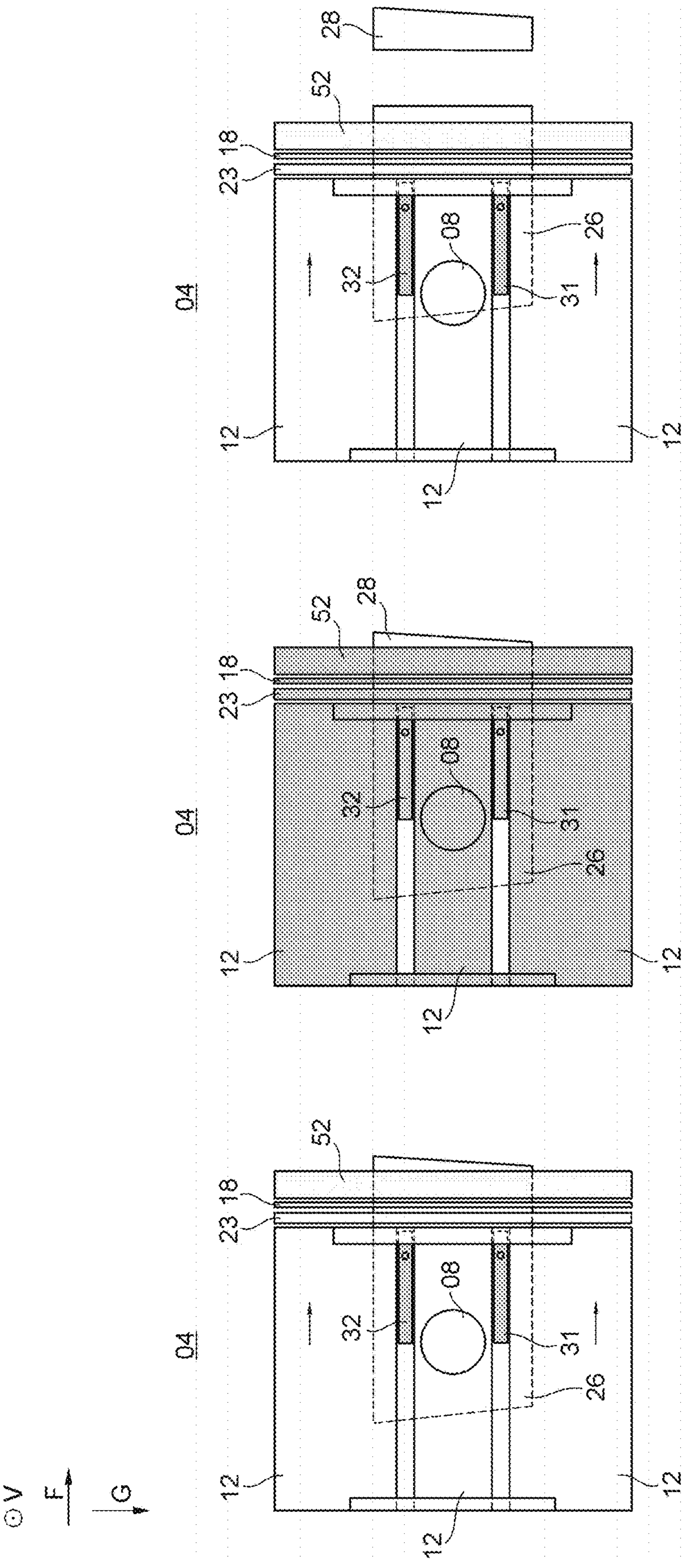
FIG. 8*x* a schematic top view according to FIG. 8*a* in an operating state in which the pile of sheets has been rotated and linearly moved and is being held by means of the pressing elements.
FIG. 8*y* a schematic top view according to FIG. 8*a* in an operating state in which the pile of sheets is being held by means of the rotary plunger, the pressing elements and a pressing plate.
FIG. 8*z* a schematic top view according to FIG. 8*a* in an operating state in which an intermediate pile has been cut off and the pile of sheets has been linearly moved and is being held by means of the pressing elements and]
Figure 9B:
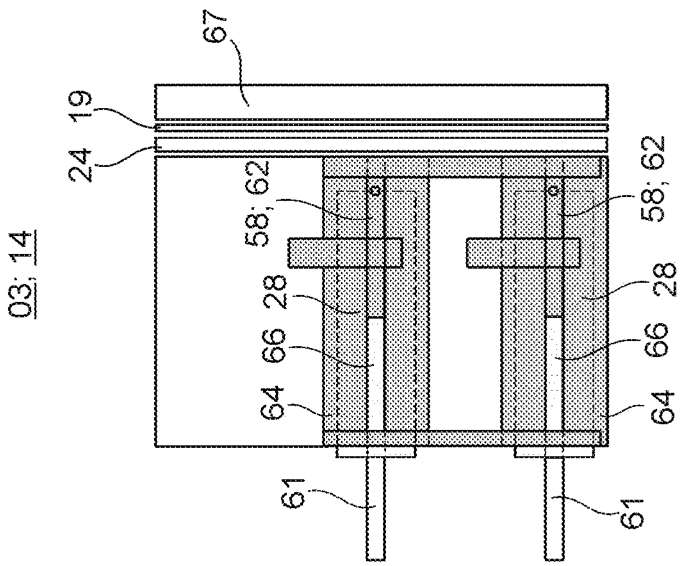
FIG. 9*b* a schematic top view according to FIG. 9*a* in an operating state in which the intermediate piles have been linearly moved and are being held by means of the pressing elements.
Figure 9A:
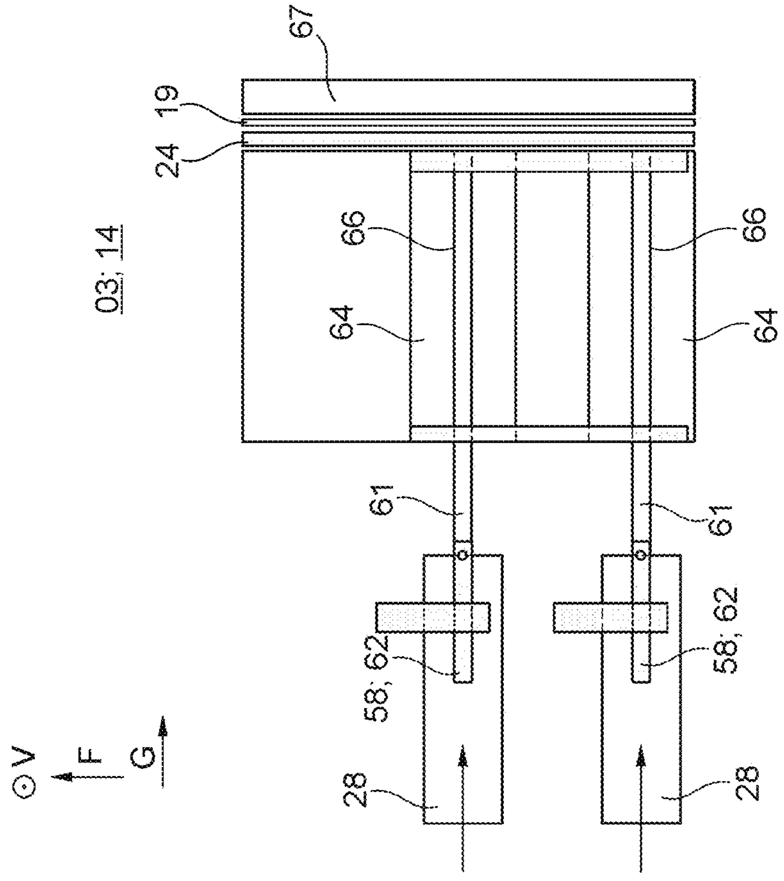
FIG. 9*a* a schematic top view onto a second pile positioning unit, a second cutting unit and two intermediate piles in an operating state in which the intermediate piles are being fed.
Figure 9E:
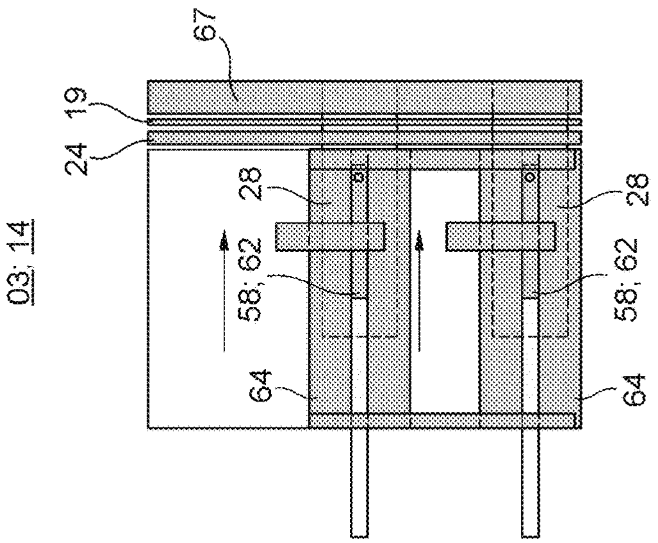
FIG. 9*e* a schematic top view according to FIG. 9*a* in an operating state in which the intermediate piles are being held by means of the pressing elements and a pressing plate.
Figure 9D:
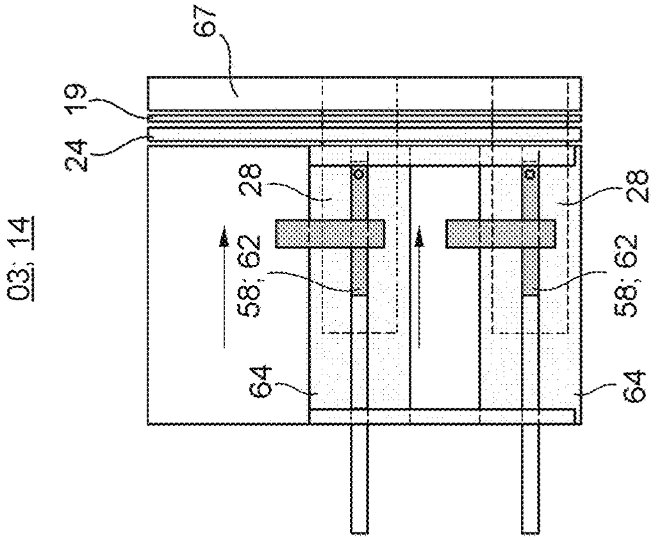
FIG. 9*d* a schematic top view according to FIG. 9*a* in an operating state in which the intermediate piles have been linearly moved and are being held by means of the pressing elements.
Figure 9C:
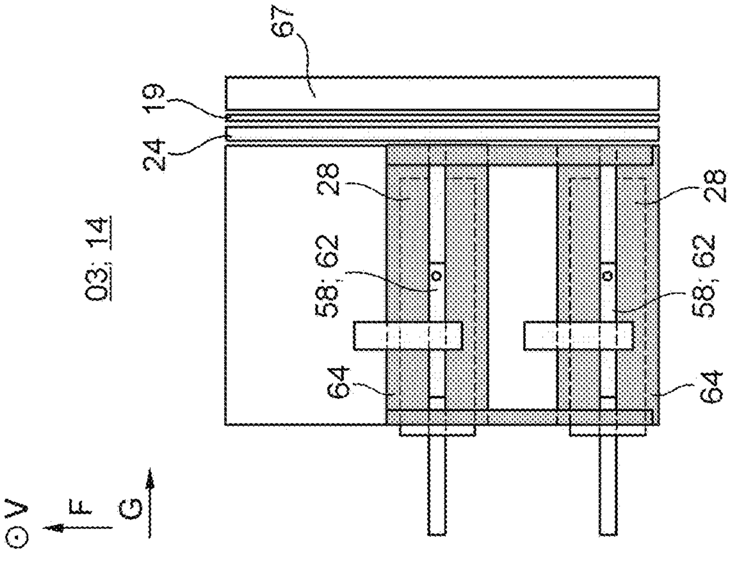
FIG. 9*c* a schematic top view according to FIG. 9*a* in an operating state in which the pressing elements have been linearly moved without the pile of sheets.
Figure 9G:
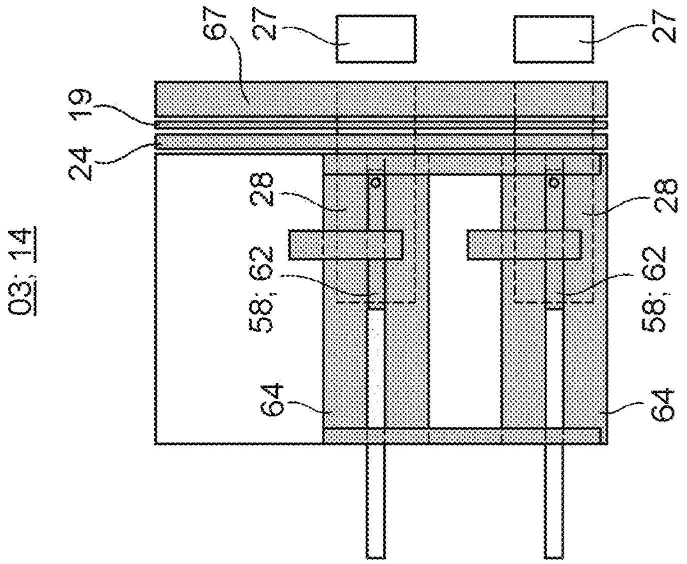
FIG. 9*g* a schematic top view according to FIG. 9*a* in an operating state in which the intermediate piles are being held by means of the pressing elements and a pressing plate.
Figure 9F:
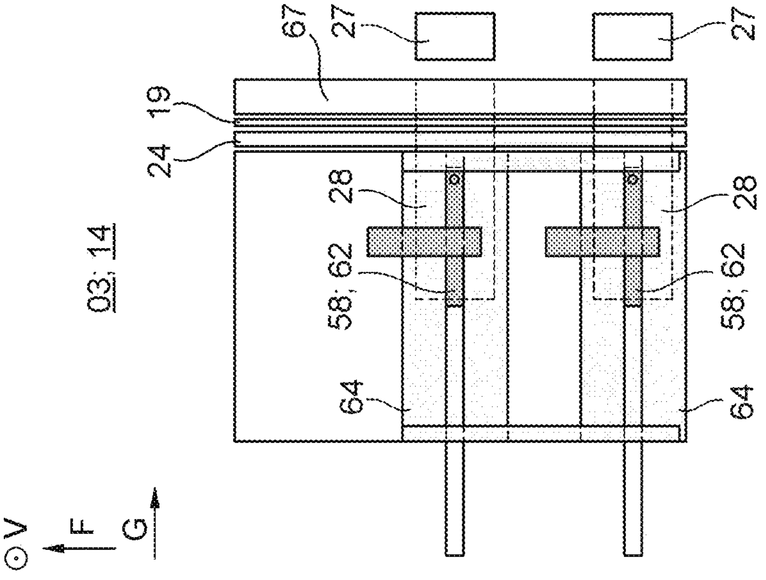
FIG. 9*f* a schematic top view according to FIG. 9*a* in an operating state in which the intermediate piles and separated multiple-up piles have been linearly moved and the intermediate piles are being held by means of the pressing elements.

Preferably, the at least two upper pressing elements 31; 32 are moved upwardly, in particular thereafter in an eleventh release operation, and are lifted off the sheet pile 26. Apart from the first pile bearing surface 04, the sheet pile 26 is now preferably only fixed and/or pressed by the at least one rotary plunger 08; 29. Preferably, the upper rotary plunger 08 is pivoted about a vertical pivot axis 07, in particular thereafter in a fifth pivoting operation, whereby the sheet pile 26 is pivoted about the vertical pivot axis 07. Preferably, the at least two upper pressing elements 31; 32 are moved downwardly, in particular thereafter in an eighth lowering operation, and are brought in contact with the sheet pile 26. Preferably, the upper rotary plunger 08 is moved upwardly, in particular thereafter in a twelfth release operation, and is lifted off the sheet pile 26. Preferably, the sheet pile 26 is moved, in particular thereafter in an eighth forward-feed operation, in or counter to the first horizontal direction F by means of the at least two upper pressing elements 31; 32 acting in particular vertically from above on the sheet pile 26. The result of this eighth forward-feed operation is also shown in FIG. 8*x* by way of example. In FIG. 8*x*, the sheet pile 26, apart from the first pile bearing surface 04, is preferably only fixed and/or pressed by the pile grippers 38; 39.

Preferably, the upper rotary plunger 08 and/or a first upper pressing plate 12 are lowered from above onto the sheet pile 26, in particular thereafter in a fifth smooth-pressing operation, and are brought in contact therewith. The result of the fifth smooth-pressing operation is also shown in FIG. 8*y* by way of example. In FIG. 8*y*, the sheet pile 26, apart from the first pile bearing surface 04, is preferably fixed and/or pressed both by the upper pressing elements 31; 32 and/or the pile grippers 38; 39, and by the at least one rotary plunger 08; 29 and the upper pressing plate 12. Preferably, a partial pile 42 is cut off the sheet pile 16, in particular thereafter in a fifth cutting operation, by means of the first cutting unit 13. This partial pile 42 corresponds to an intermediate pile 28, for example.

Preferably, the upper rotary plunger 08 and the first upper pressing plate 12 are moved upwardly, in particular thereafter in a thirteenth release operation, and are lifted off the sheet pile 26. Preferably, the sheet pile 26 is moved, in particular thereafter in a ninth forward-feed operation, in or counter to the first horizontal direction F by means of the at least two upper pressing elements 31; 32 acting in particular vertically from above on the sheet pile 26. For example, at the same time, the previously cut-off intermediate pile 28 is moved with respect to the first horizontal direction F. The result of this ninth forward-feed operation is also shown in FIG. 8*z* by way of example. In FIG. 8*z*, the sheet pile 26, apart from the first pile bearing surface 04, is preferably only fixed and/or pressed by the pile grippers 38; 39.

The method is preferably continued accordingly until the sheet pile 26 has been cut completely into intermediate piles 28. So as to cut the resulting intermediate piles 28 into multiple-up piles 27, in particular security piles 27, these are preferably transported to the second cutting unit 14, in particular without being pivoted. There, operations of the method are preferably analogous to those in the first cutting unit 13, however without pivoting operations or operations that relate to a rotary plunger 08. For example, two intermediate piles 28 are moved linearly by means of upper pressing elements 62 in a forward-feed operation. For example, the intermediate piles 28 are then clamped by means of at least one second pressing plate 64, and thereafter the upper pressing elements 62 are embraced, and thereafter the second pressing plate 64 is lifted, and thereafter the two intermediate piles 28 are pushed onward. For example, thereafter the second pressing plate 64 is lowered, and a respective multiple-up pile 27, in particular security pile 27, is cut off. For example, thereafter an embracing by means of the upper pressing elements 62, a renewed lifting of the second pressing plate 64, another forward-feed operation, and thereafter another lowering of the second pressing plate 64 and a cutting-off of two further multiple-up piles 27, in particular security piles 27, take place.

For example, the pressure exerted by means of the respective upper pressing plate 12; 64 is maintained at a level that is as uniform as possible, regardless of the remaining size and in particular the surface area of the sheet pile 26 or intermediate pile 28 to be pressed. For this purpose, the force exerted by means of the respective upper pressing plate 12; 64 is preferably adapted to the remaining and/or covered surface area of the respective sheet pile 26 or intermediate pile 28.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A pile cutting device comprising:

a first pile positioning unit, at least one first cutting unit for cutting at least one sheet pile, and at least one bearing device including a first pile bearing surface, the first pile positioning unit comprising an upper rotary plunger pivotable about a vertical pivot axis and movable in a vertical direction, the first pile positioning unit further comprising a first horizontal drive and a second horizontal drive actuatable for moving the at least one sheet pile in and/or counter to a first horizontal direction, the first pile positioning unit further comprising at least two upper pressing elements including a first upper pressing element and a second upper pressing element that are moveable separately with respect to the upper rotary plunger in the vertical direction for contacting an upper side of the sheet pile, wherein, at least while contacting the upper side of the sheet pile, the first upper pressing element is movable in and/or counter to the first horizontal direction by the first horizontal drive, and the second upper pressing element is movable separately from the first upper pressing element in and/or counter to the first horizontal direction by the second horizontal drive.

2. The pile cutting device according to claim 1, wherein the first pile positioning unit comprises a lower rotary plunger, which can be pivoted about the pivot axis.

3. The pile cutting device according to claim 2, characterized in that an upper contact surface of the lower rotary plunger is arranged no higher than at a height of the first pile bearing surface.

4. The pile cutting device according to claim 1, wherein the first pile positioning unit further comprises at least two lower pressing elements, which are movable in and/or counter to the first horizontal direction by one of the first horizontal drive or the second horizontal drive.

5. The pile cutting device according to claim 4, wherein the at least two lower pressing elements comprise a first lower pressing element and a second lower pressing element, wherein the first upper pressing element and the first lower pressing element are assigned to one another and together form a pile gripper, and that the first upper pressing element and the first lower pressing element, which together form the pile gripper, are movable together in and/or counter to the first horizontal direction.

6. The pile cutting device according to claim 1, further comprising at least one first upper pressing plate, which is arranged so as to be movable in the vertical direction.

7. The pile cutting device according to 6, wherein at least a portion of the at least one first upper pressing plate is arranged upstream from the upper rotary plunger, based on the first horizontal direction, and at least a portion of the at least one first upper pressing plate is arranged downstream from the upper rotary plunger, based on the first horizontal direction.

8. The pile cutting device according to claim 1, wherein the first cutting unit comprises at least one first knife bar, at which a first knife is arranged, and the first horizontal direction corresponds to a direction from the upper rotary plunger to the first knife.

9. The pile cutting device according to claim 1, wherein the upper rotary plunger and at least one of the first upper pressing element or the second upper pressing element are situated at a smallest distance with respect to one another, which is no more than 100 mm and/or no more than 50 mm and/or no more than 30 mm and/or no more than 20 mm and/or no more than 10 mm and/or no more than 5 mm and/or no more than 2 mm.

10. The pile cutting device according to claim 4, wherein the lower rotary plunger and at least one lower pressing element of the at least two lower pressing elements are situated at a smallest distance with respect to one another, which is no more than 100 mm and/or no more than 50 mm and/or no more than 30 mm and/or no more than 20 mm and/or no more than 10 mm and/or no more than 5 mm and/or no more than 2 mm.

11. A method for cutting a sheet pile by means of a pile cutting device, the sheet pile initially resting on a first pile bearing surface of a first bearing device, the method comprising:

in a first forward-feed operation, moving the sheet pile in or counter to a first horizontal direction in relation to a first cutting unit, by movement of at least two upper pressing elements acting vertically from above on the sheet pile, in a first lowering operation, lowering a rotary plunger that is pivotable about a vertical pivot axis such that a lower contact surface of the rotary plunger makes contact with the sheet pile, in a first release operation, moving the at least two upper pressing elements upwardly and off the sheet pile, in a first pivoting operation, pivoting the rotary plunger about the vertical pivot axis, to cause the sheet pile to pivot about the vertical pivot axis, in a second lowering operation, moving the at least two upper pressing elements downwardly and into contact with the sheet pile following the pivoting, in a second release operation, moving the rotary plunger upwardly and off the sheet pile while the at least two upper pressing elements contact the sheet pile, in a second forward-feed operation, moving the sheet pile in or counter to the first horizontal direction by moving the at least two upper pressing elements, and following the second forward-feed operation, in a first cutting operation, cutting a partial pile off the sheet pile by means of the first cutting unit.

12. The method according to claim 11, wherein the rotary plunger and/or a first upper pressing plate are lowered from above onto the sheet pile after the second forward-feed operation and prior to the first cutting operation in a smooth-pressing operation, and are brought into contact with the sheet pile.

13. The method according to claim 11, wherein, in at least one operation of the method, the sheet pile is moved in or counter to the first horizontal direction by means of the at least two upper pressing elements in contact with an upper side of the sheet pile, and an orientation of the sheet pile is changed in that the at least two upper pressing elements are moved different distances in or counter to the first horizontal direction while the at least two upper pressing elements move the sheet pile.

* * * * *